United States Patent [19]
Nemoto et al.

[11] Patent Number: 5,058,455
[45] Date of Patent: Oct. 22, 1991

[54] TRANSMISSION ASSEMBLY FOR TRACTOR

[75] Inventors: Shusuke Nemoto, Yao; Keisaku Hikishima, Kobe; Yoshiyuki Kirihata, Itami, all of Japan

[73] Assignee: Kanzaki Kokyukoki Mfg., Ltd., Amagasaki, Japan

[21] Appl. No.: 569,563

[22] Filed: Aug. 20, 1990

[30] Foreign Application Priority Data

Aug. 31, 1989 [JP] Japan .................. 1-102410[U]
Mar. 4, 1990 [JP] Japan .................. 2-22068[U]

[51] Int. Cl.$^5$ .................. F16H 57/02; F16H 3/02
[52] U.S. Cl. .................. 74/606 R; 74/745
[58] Field of Search .................. 74/606 R, 745, 359

[56] References Cited

U.S. PATENT DOCUMENTS

| 4,326,597 | 4/1982 | Murayama et al. | 74/745 X |
| 4,628,768 | 12/1986 | Omura et al. | 74/745 |
| 4,686,869 | 8/1987 | Beim | 74/745 |
| 4,716,775 | 1/1988 | Horii et al. | 74/745 X |

FOREIGN PATENT DOCUMENTS 63-39449  8/1988  Japan .................. 74/606 R

Primary Examiner—Vinh T. Luong
Attorney, Agent, or Firm—Tilton, Fallon, Lungmus

[57] ABSTRACT

A bearing support frame (10) is disposed within a rear end portion of a tractor front housing (1) having an open rear end. The frame is secured to internal boss (2c) on a transmission casing (1), which is fastened to the rear of the front housing and has an open front end, and is used for supporting respective one ends of transmission shafts (4, 5, 7, 8) for both of an additional speed change mechanism (6), which is disposed within a rear half of the front housing, and a main speed change mechanism (9) which is disposed within a front half of the transmission casing. An intermediate shaft (17) interposed between the additional and main change mechanisms is also supported by the support frame.

The support frame which is preferably composed of front and rear bearing support plates (10A, 10B) facilitates an easy assembly of the change mechanisms.

4 Claims, 14 Drawing Sheets

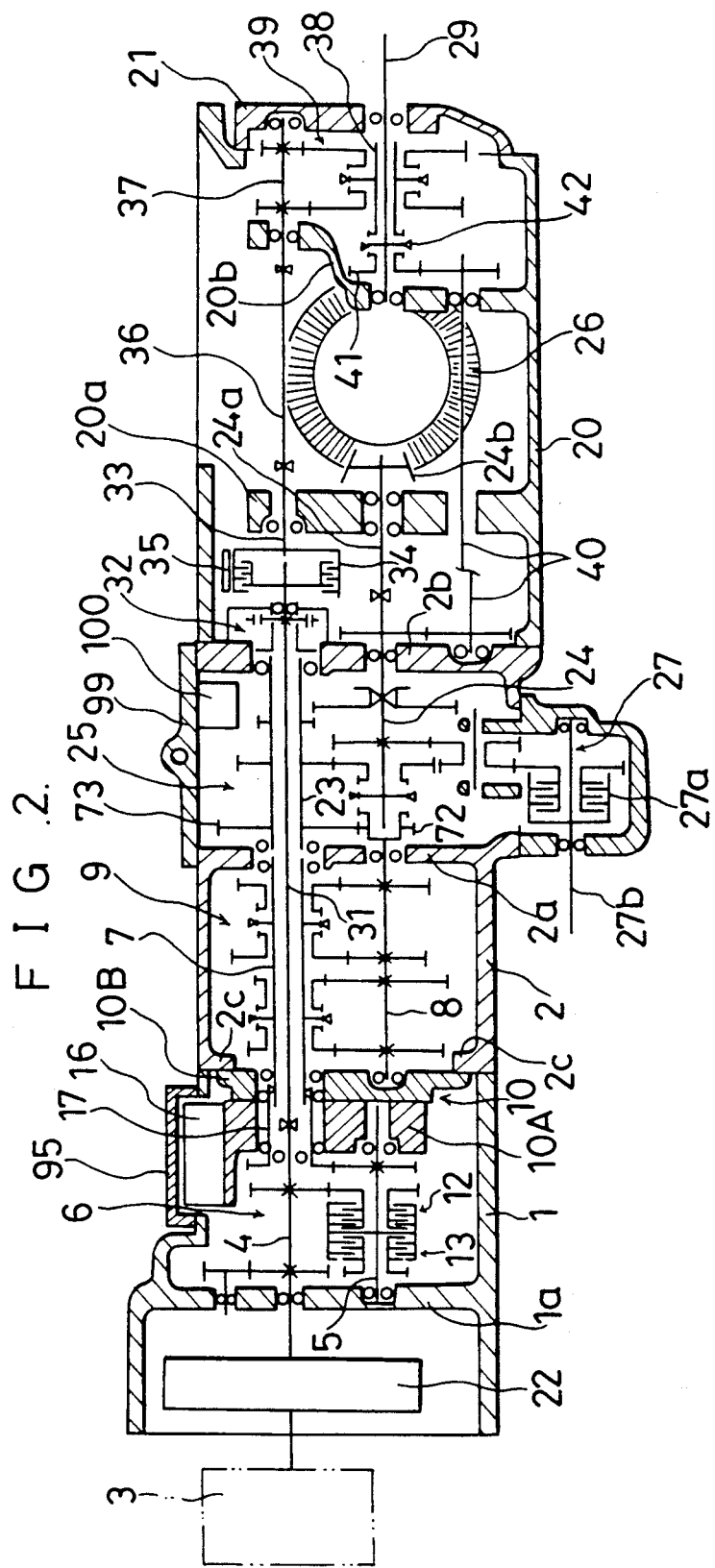

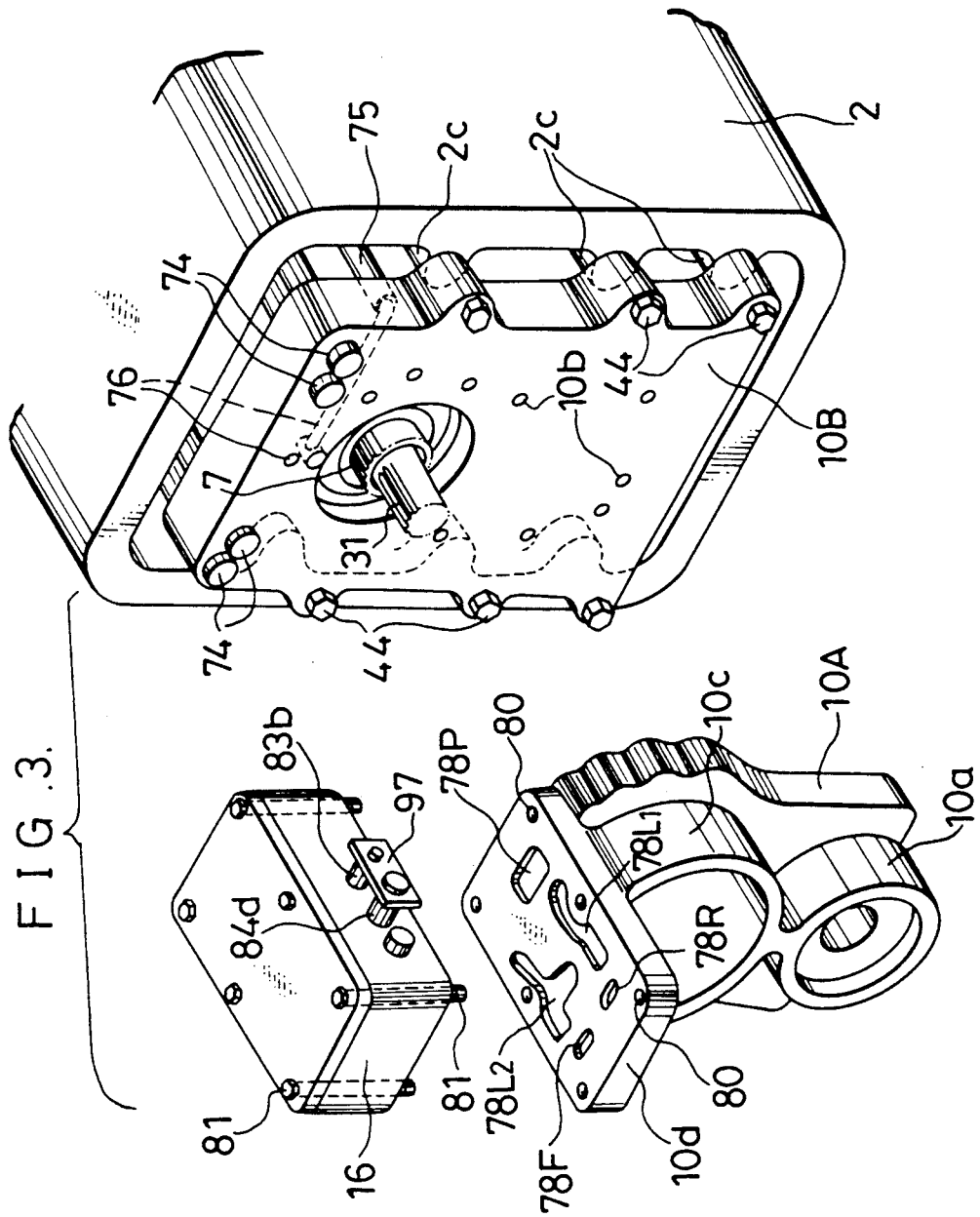

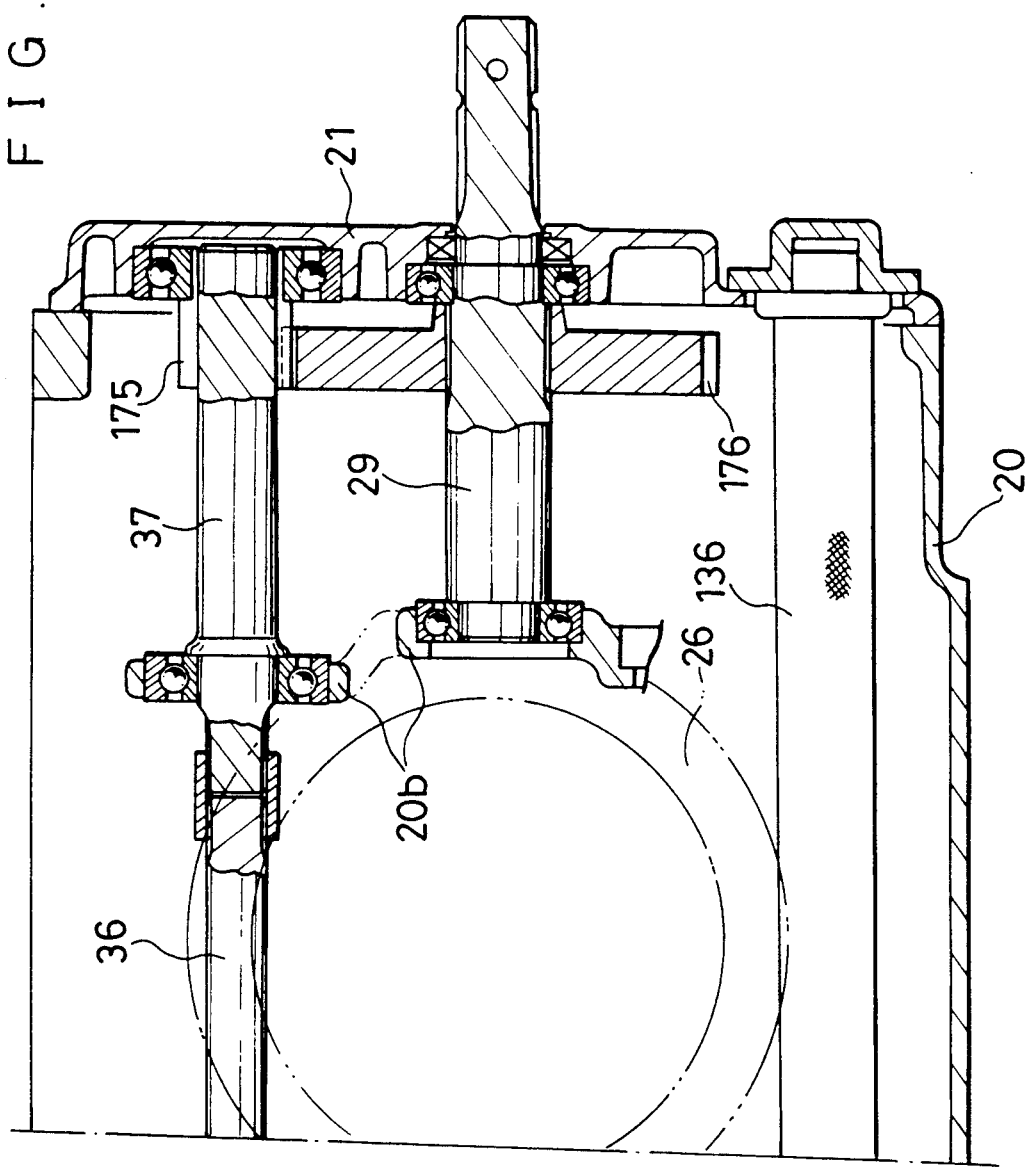

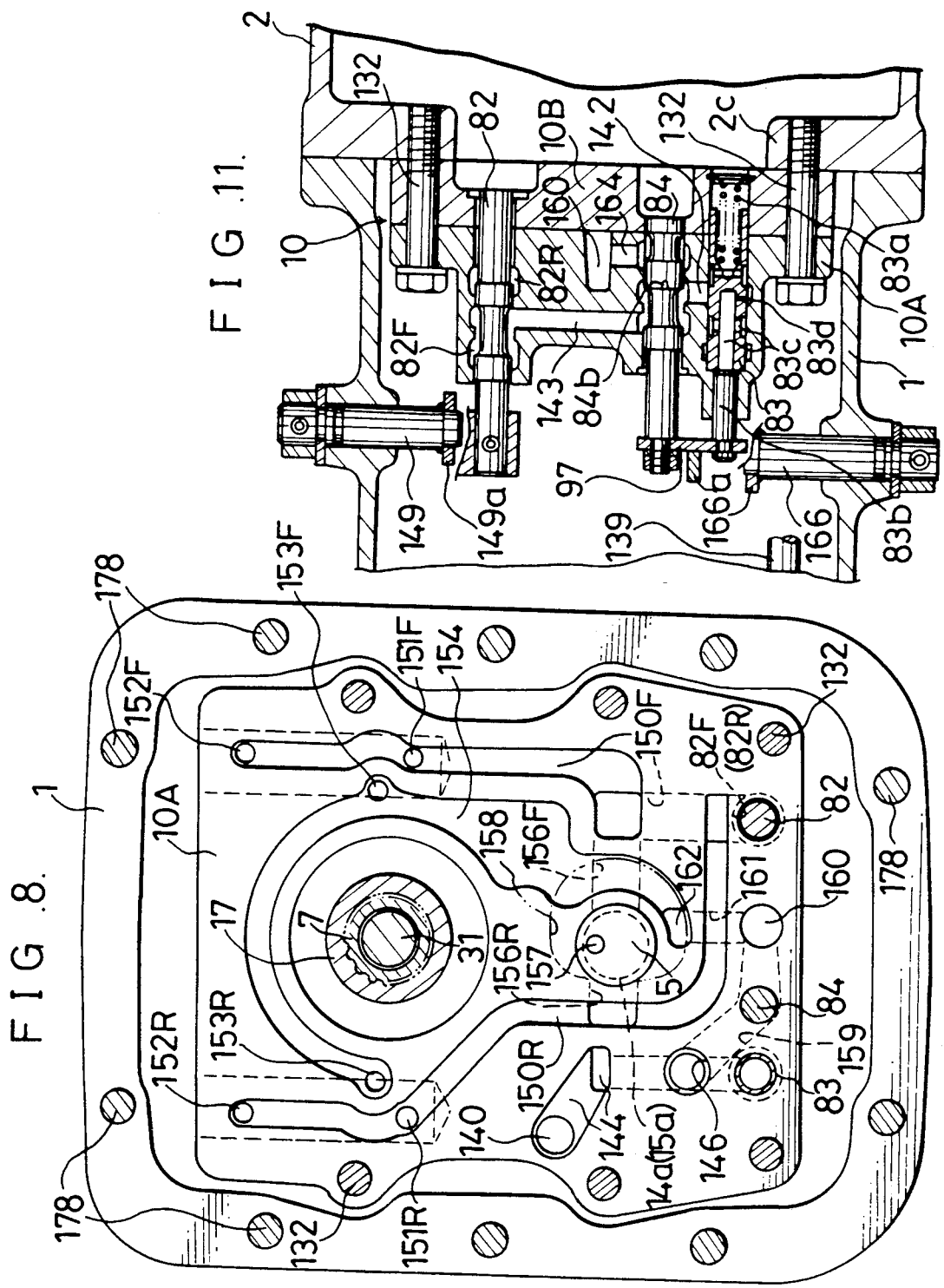

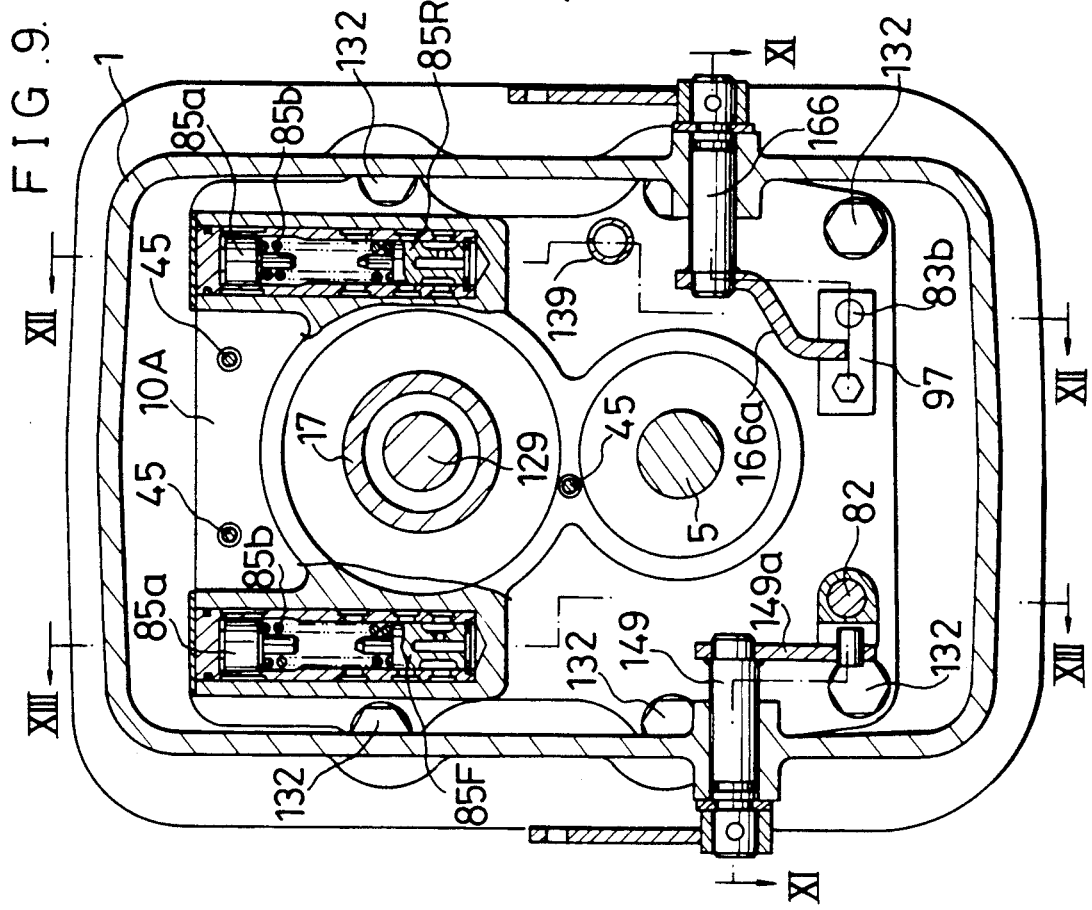

TRANSMISSION ASSEMBLY FOR TRACTOR

FIELD OF THE INVENTION

This invention relates to a transmission assembly for tractors of a type having a front housing and transmission casing which are arranged in series in a longitudinal direction of the tractor.

More particularly, the present invention relates to a transmission assembly for tractors coring an additional speed change mechanism, which is disposed within a rear half of a front housing, and a main speed change mechanism which is disposed within a front half of a transmission casing.

BACKGROUND OF THE INVENTION

In a tractor having a front housing which includes at its front end portion an engine flywheel and main clutch, there remains a spare space within a rear half of the front housing. Such spare space is often used for providing an additional speed change mechanism which allows, in cooperation with a speed change transmission in a transmission casing a fine control of the vehicle speed so as to adapt the same for various working purposes which are carried out using the tractor.

Japanese Patent Publication No. 63-39449 issued on Aug. 5, 1988 discloses a typical example of a transmission assembly in which such additional speed change mechanism is provided. This is done in a fashion so as to permit an easy exchange of the change mechanism according to a given design of the tractor, while remaining the speed change transmission in a transmission casing unchanged, and so as to permit an easy assembly of the additional speed change mechanism into the front housing.

In the tractor shown in this prior art literature, the front housing is fashioned to include an open rear end and an intermediate wall which is located in front of the additional speed change mechanism. Front and rear transmission casings fastened together are provided in which the front casing includes an intermediate wall, located in front of a main speed change mechanism, and a rear wall located behind the main speed change mechanism. A bearing support plate or frame is disposed within a front end portion of the front transmission casing and is secured to the rear of the front housing. A primary shaft and speed change shaft, between which the additional speed change mechanism performs a speed-change transmission, are supported respectively by the intermediate wall of the front housing and by the bearing support frame. A drive shaft, and second speed change shaft between which the main speed change mechanism performs a speed-change transmission, are supported respectively by the intermediate wall of the front transmission casing and by the rear wall of this casing. The speed change shaft of additional speed change mechanism and the drive shaft of main speed change mechanism are coupled with each other at a space in front of the intermediate wall in the front transmission casing.

In assembling the additional speed change mechanism employed in the prior art transmission assembly set forth above, the primary and speed change shafts are supported at their front end portions by the intermediate wall in the front housing under a condition where the front transmission casing is separated from the front housing and where the bearing support frame has not been secured yet to the rear of front housing. Then gears and other elements of the additional change mechanism are mounted from the rear end opening of front housing onto the primary and change shafts. Rear end portions of these shafts are then supported by securing the bearing support frame to the rear of the front housing. The front housing and front transmission casing are then assembled and fastened together, there being a connection between the speed change shaft of additional speed change mechanism and the drive shaft of main speed change mechanism by means of a coupling member disposed between these shafts. It is thus seen that the additional speed change mechanism can be assembled with ease. However, attention is paid only to an easy assembly of the additional speed change mechanism and, therefore, this prior art structure involves problems which will be detailed hereinafter.

First, while space in front of the intermediate wall in the front transmission casing is used for providing the bearing support frame and for providing a connection between the speed change shaft of additional speed change mechanism and the drive shaft of main speed change mechanism, the main speed change mechanism is disposed between the intermediate and rear walls of front transmission casing by using these walls as supports for the drive and speed change shafts of the main speed change mechanism. Such structure will make assembly of the main speed change mechanism very troublesome. That is, gears and other elements of the main speed change mechanism must be put into the front transmission casing through an opening to be formed in the top wall or one of the side walls of the casing and, then, the drive and speed change shafts must be set between the intermediate and rear walls by passing it through one of these walls under a condition where the gears and other elements referred to above are kept in their proper positions. This assembly procedure is very hard and expensive.

Further, when design of the tractor or its transmission assembly is changed so that it comprises the same transmission mechanism within the transmission casing but now includes no additional speed change mechanism within the front housing, a large dead space will be resulted within the transmission casing because the space in front of the intermediate wall of the casing is used only for providing a connection between shafts.

OBJECT

Accordingly, a primary object of the present invention is to provide a novel transmission assembly for tractors which facilitates the assembly of not only an additional speed change mechanism, disposed within a front housing of tractor, but a main speed change mechanism disposed within a transmission casing of the tractor, and which space within the transmission casing is put to use effectively in a fashion such that, even when design of the tractor is changed so that it includes no additional speed change mechanism within the front housing of the tractor, no substantial dead space will be caused within the transmission casing.

SUMMARY OF THE INVENTION

The present invention relates to a transmission assembly to be employed in a tractor having a front housing 1 and transmission casing 2, as depicted respectively in FIGS. 1A, 1B and 2, in FIG. 6 and in FIGS. 7A and 7B, which are arranged in series in a longitudinal direction of the tractor and are fastened together. The front housing 1 includes an open rear end and an intermediate wall 1a. The transmission assembly comprises an additional speed change mechanism 6 which is disposed within the front housing 1 and behind the intermediate wall 1a, set forth above, so as to perform a speed-change transmission between a primary shaft 4, driven by engine 3 (FIG. 2), and a first speed change shaft 5. The transmission assembly further comprises a main speed change mechanism 9 which is disposed within a front half of the transmission casing 2 so as to perform a speed change transmission between a drive shaft 7, driven by the first speed change shaft 5 set forth above, and a second speed change shaft 8.

As shown respectively in FIGS. 1A, 1B and 2 and in FIGS. 7A and 7B, the transmission casing 2 is fashioned according to the present invention to include an open front end, an intermediate wall 2a which is located behind the main speed change mechanism 9, and integral boss means 2c which project from an inner wall of the transmission casing into its open front end. As shown respectively in FIGS. 1A and 2, in FIG. 6 and in FIG. 7A, a bearing support frame 10 is disposed within a rear end portion of the front housing 1 and is secured to boss means 2c set forth above.

As shown respectively in FIGS. 1A, 1B and 2, in FIG. 6 and in FIGS. 7A and 7B, the primary shaft 4 and first speed change shaft 5 are supported respectively by the intermediate wall 1a of the front housing 1 and by a front portion of the bearing support frame 10, whereas the drive shaft 7 and second speed change shaft 8 are supported respectively by a rear end portion of the bearing support frame 10 and by the intermediate wall 2a of the transmission casing 2.

As shown respectively in FIGS. 1A and 2, in FIG. 6 and in FIG. 7A, an intermediate shaft is supported by the bearing support frame 10 for connecting the first speed change shaft 5 drivingly to the drive shaft 7.

The transmission assembly according to the present invention may be assembled as follows:

As can be understood clearly from FIGS. 1A, 1B and 2 and from FIGS. 7A and 7B, respectively, the main speed change mechanism 9 is assembled firstly under a condition where the front housing 1 and transmission casing 2 are separated from each other. Under a condition where the bearing support frame 10 has not been secured yet to the front of transmission casing 10, the drive shaft 7 and second speed change shaft 8 are put into the transmission casing and are supported at rear end portions of these shafts by the intermediate wall 2a. Next, gears and other elements of the main speed change mechanism 9 are put successively into the transmission casing 2 through the open front end of this casing and are mounted onto the shafts 7 and 8. Then, the bearing support frame 10 is mounted on the front of transmission casing 2 so as to support front end portions of respective shafts 7 and 8 and is secured to the boss means 20.

The additional speed change mechanism 6 may then be pre-assembled separately outside of the front housing 1. As can be understood respectively from FIGS. 1A and 2, from FIG. 6 and from FIG. 7A, the intermediate shaft 17 and rear end portions of the primary shaft 4 and first speed change shaft 5 may be supported by the bearing support frame 10 which has been secured to the boss means 2c. Gears and other elements of the additional speed change mechanism 6 are mounted successively onto the shafts 4 and 5, which are now supported by the support frame 10, from the front ends of these shafts. After the change mechanism has been pre-assembled in the manner set forth above, the front housing 1 is put on the front of transmission casing 2 so that the change mechanism 6 and support frame 10 are brought into housing 1 and the shafts 4 and 5 are supported at their front end portions by the intermediate wall 1a of front housing. The housing 1 and casing 2 are then fastened together.

As described above, the transmission assembly according to the present invention is fashioned such that the main speed change mechanism 9 ma be assembled into a front half of the transmission casing 2 from the front end opening of this casing using the intermediate wall 2a of this casing as a support and such that the additional speed change mechanism 6 may be assembled at an outside of the front housing 1 using the bearing support frame 10, having been supported by the transmission casing, as a support. Consequently, both of the main and additional speed change mechanisms 9 and 6 may be assembled with ease.

In the transmission assembly according to the present invention, the drive shaft 7 of main speed change mechanism 9 is supported at its front end by a rear end portion of the bearing support frame 10 and is connected to the change shaft 5 of additional speed change mechanism 6 through the intermediate shaft 17 supported by the bearing support frame 10. Further, the bearing support frame 10 is disposed within a rear end portion of the front housing 1. Consequently, the main speed change mechanism 9 may be disposed within a front half of the transmission casing 2 such that this change mechanism 9 has its front end substantially at the front end of transmission casing 2. It is thus seen that, even when a tractor is designed such that it includes no additional speed change mechanism, as shown in FIG. 14, by employing a front housing 201 having a rear wall 201b but by using a transmission casing 2 employed for the transmission assembly according to the present invention, no substantial dead space will be caused within the transmission casing.

As shown respectively in FIGS. 1A, 2 and 3, in FIG. 6 and in FIG. 7A, the bearing support frame 10 may preferably comprise a front bearing support plate 10A and rear bearing support plate 10B which are disposed on each other and are fastened together. These bearing support plates are used such that the primary shaft 4 and first speed change shaft 5 are supported by the front bearing plate 10A, while the drive shaft 7 and second speed change shaft 8 are supported by the rear bearing plate 10B, and the intermediate shaft 17 is supported by the front and rear support plates 10A and 10B.

This structure permits an easy molding of the bearing support frame 10.

In addition to this structure, the additional speed change mechanism 6 may preferably be fashioned to a fluid-operated mechanism which has fluid-operated clutches 12 and 13, as shown in FIG. 1A, mounted on the first speed change shaft 5. As shown in FIGS. 1A and 3, the front bearing support plate 10A includes a hollow cylindrical portion 10a which receives a rear end portion of the change shaft 5 such that annular fluid chambers 14a and 15a communicating with clutch-operating fluid passages 14 and 15 in the shaft 5 are defined in the hollow cylindrical portion 10a. As shown in FIG. 1A and FIGS. 2 to 4, a control valve assembly 16 for the fluid-operated speed change mechanism 6 is mounted on the front bearing support plate 10A, and fluid passages 18 and 19 for connecting the control valve assembly 16 to the annular chambers 14a and 15a are formed between the front and rear bearing support plates 10A and 10B.

In this structure, the annular fluid chambers 14a and 15a defined in the cylindrical portion 10a act as rotary joints for connecting fluid passages 14 and 15 in the rotatable shaft 5 to fluid passages 18 and 19 which are fixed in position. Fluid passages 18 and 19 between the front and rear bearing support plates 10A and 10B may be formed with ease such that recesses or grooves corresponding to the passages 18 and 19 are formed in a surface of one of these support plates, when this one plate is molded, and are sealed by disposing the other support plate on the former support plate so as to provide the fluid passages.

As compared to a mechanically operated speed change mechanism, a fluid-operated change mechanism is advantageous in that it may be controlled with ease using control valve means. The structure set forth above permits a pre-assembly of the fluid-operated speed change mechanism 6 and all of the accessories thereof including a control valve assembly 16 at a location outside of the front housing 1. A required fluid connection between the fluid-operated clutches 12 and 13 and the control valve assembly 16 therefor is attained with minimum number of parts and in a compact fashion.

Another preferred structure according to the present invention is shown in FIGS. 7A, 11 and 13. Here again, the additional speed change mechanism 6 is fashioned to a fluid-operated mechanism having fluid-operated clutches 12 and 13 which are mounted on the first speed change shaft 5. The bearing support frame 10 includes a hollow cylindrical portion 10a which receives a rear end portion of the change shaft 5 such that annular fluid chambers 14a and 15a communicating with clutch-operating fluid passages 14 and 15 in the shaft 5 are defined in the portion 10a. A control valve 82 for the fluid-operated change mechanism 6 is disposed within the bearing support frame 10.

This structure also permits an easy assembly of the fluid-operated speed change mechanism 6. Fluid passages between the control valve 82 and fluid chambers 14a and 15a are provided within the bearing support frame 10. As can be seen, a very compact structure is attained.

BRIEF DESCRIPTION OF THE DRAWINGS

Other objects and advantages of the invention will become readily apparent as the specifications is considered in conjunction with the accompanying drawings in which:

FIG. 2 is a schematic sectional side view of the tractor shown i FIG. 1 showing the whole of transmission system employed in the tractor, the section being taken generally along line II—II of FIG. 1;

FIG. 3 is an exploded perspective view of a part of the first embodiment;

FIG. 7C is a sectional side view of a rear end portion of the tractor shown in FIGS. 7A and 7B, the section being taken by a vertical plane same as that for the section of FIGS. 7A and 7B;

FIG. 8 is an enlarged sectional view taken generally along line VIII—VIII of FIG. 7A;

FIG. 9 is an enlarged sectional view taken generally along line IX—IX of FIG. 7A;

FIG. 10 is an enlarged sectional view taken generally along line X—X of FIG. 7A;

FIG. 11 is a sectional plan view taken generally along line XI—XI of FIG. 9;

DESCRIPTION OF THE PREFERRED EMBODIMENTS

Figure 1:
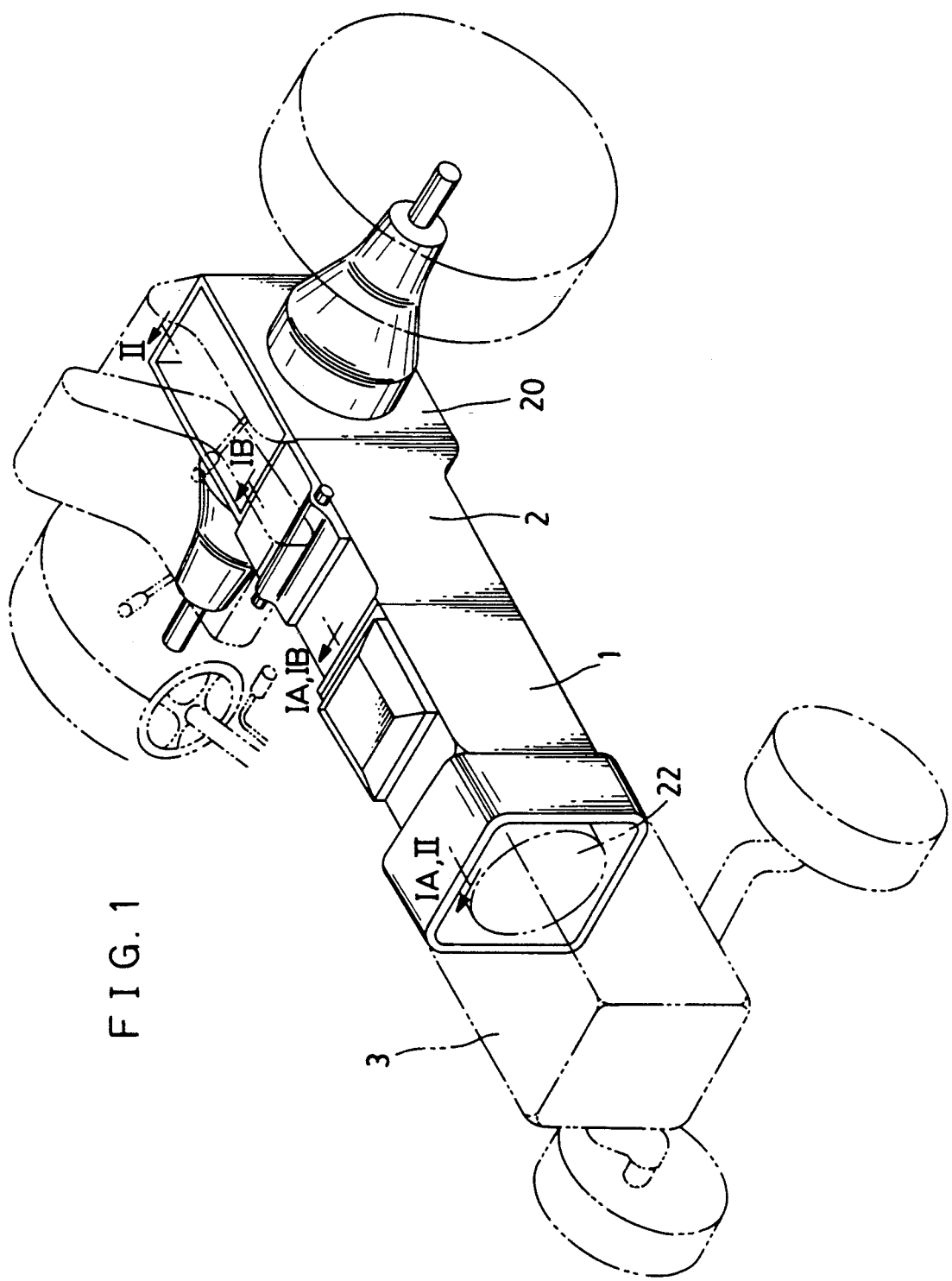
FIG. 1 is a schematic perspective view of a tractor in which a first embodiment of the transmission assembly according to the present invention is employed.

A first preferred embodiment is shown in FIGS. 1 to 5. The vehicle body of the tractor in which this first embodiment is employed is composed of the front housing 1 and transmission casing 2, referred to before, and further a rear housing 20, shown in FIGS. 1 and 2, which is secured to the rear of transmission casing 2. The transmission casing 2 includes a rear wall 2b, and the rear housing 20 includes in it front and rear support walls 20a and 20b which are projected upwardly from the inner bottom wall of housing 20. A rear end opening of the rear housing 20 is closed using a rear end cover 21:

As also shown in FIG. 2, engine 3 is disposed at the foremost end of vehicle and is connected to a flywheel 22 which is disposed within a front end portion of the front housing 1. The primary shaft 4 referred to before is connected directly to the flywheel 22 and is adapted to supply power of engine to both of vehicle-driving power transmission system and implement-driving power transmission system.

The vehicle-driving power transmission system includes, other than the additional and main speed change mechanisms 6 and 9 referred to before, an auxiliary speed change mechanism 25 which is disposed within a rear half of the transmission casing 2. This change mechanism 25 performs a speed-change transmission between a lay shaft 23 and propeller shaft 24 which are supported respectively by the aforementioned intermediate wall 2a and by the rear wall 2b of transmission casing 2. The propeller shaft 24 has an extension shaft 24a, connected thereto and supported by the front support wall 20a in the rear housing 20, which carries at its rear end a bevel pinion 24b. This pinion meshes with an input bevel gear 26 of a differential gearing for left and right rear wheels of the tractor (both not shown). A gear mechanism 27 is provided for transmitting vehicle-driving power from propeller shaft 24 to left and right front wheels (not shown) when required. This gear mechanism 27 includes a front wheel-driving clutch 27a and a transmission shaft 27b which is driven through the clutch 27a.

A PTO (power takeoff) shaft 29 is supported by the rear support wall 20b and rear end cover 21 of rear housing 20 and extends rearwardly from the rear housing. For transmitting power to this PTO shaft 29 from the primary shaft 4, the intermediate shaft 17, drive shaft 7 and lay shaft 23 which are disposed co-axially in the vehicle-driving power transmission system are formed into hollow shafts. A drive shaft 31 of the implement-driving power transmission system extends through these hollow shafts 17, 7 and 23 and is coupled at its front end to the primary shaft 4. Within a front end portion of the rear housing 20, a hydraulic pump 32 is disposed which is fashioned to a gear pump using the drive shaft 31 as its pump shaft. A clutch shaft 33 is disposed rearwardly of and co-axially with the drive shaft 31, and a fluid-operated PTO clutch 34 is incorporated between these shafts 31 and 33. A brake 35 is associated with the clutch 34 for preventing an inertial rotation of the clutch shaft 33 after the PTO clutch has been disengaged. The clutch shaft 33 is connected to co-axial fronter and rearer transmission shafts 36 and 37. A hollow speed change shaft 38 is mounted rotatably on the PTO shaft 29, and a PTO speed change mechanism 39 is disposed between the rearer transmission shaft 37 and speed change shaft 38. Another transmission shaft 40 driven to rotate by the propeller shaft 24 is disposed at a low level within the rear housing 20 and drives a ground PTO gear 41 which is mounted rotatably on the PTO shaft 29. A PTO-selecting clutch 42 is provided which operates to connect any one of the change shaft 38 and ground PTO gear 41 selectively to the PTO shaft 29.

Figure 1A:
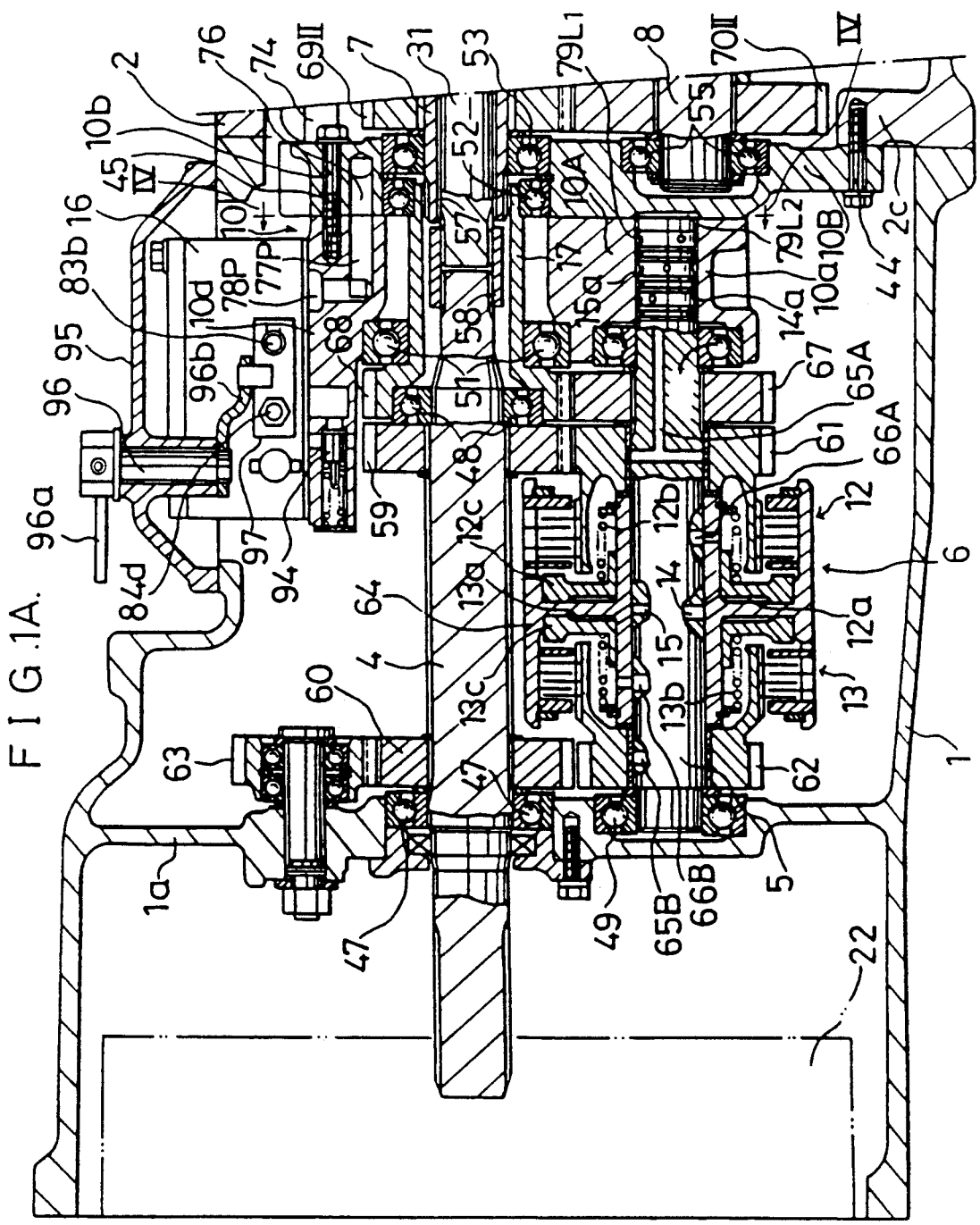
FIGS. 1A and 1B are sectional side views, partially developed, of a part of the tractor shown in FIG. 1, the sections being taken generally along line IA—IA and line IB—IB of FIG. 1, respectively.
Figure 4:
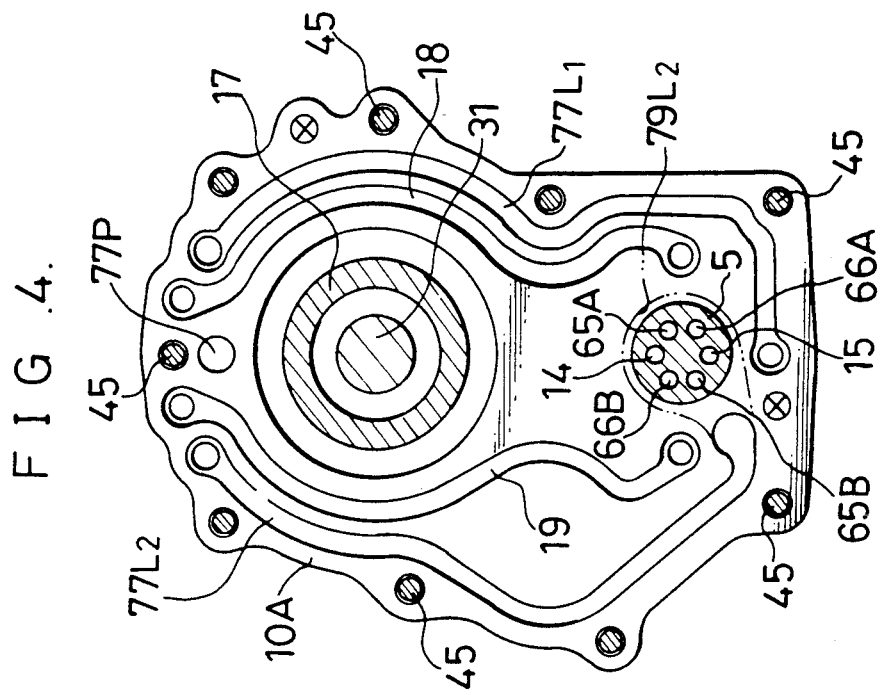
FIG. 4 is a sectional rear view of a part of the tractor shown in FIG. 1, the section being taken generally along line IV—IV of FIG. 1A.

As shown in FIG. 1A and FIGS. 3 and 4, the bearing support frame 10 is composed of front and rear bearing support plates 10A and 10B. Of these support plates, the rear support plate 10B is formed to have a size somewhat smaller than those of the end openings of front housing 1 and transmission casing 2 and is secured to plural bosses 2c on the inner wall of transmission casing 2 using bolts 44 which are threadingly engaged to the bosses from the front side of plate 10B. The front bearing support plate 10A is formed to have a size smaller than that of the rear bearing support plate 10B and is secured to the plate 10B using bolts 45 which are passed through bores 10b in the rear plate 10B from the rear side of this plate and are threadingly engaged with corresponding threaded bores in the front plate 10A. Consequently, the front bearing support plate 10A is attached to the rear bearing support plate 10B before the latter plate is attached to the front of transmission casing 2. For an easy understanding of the structure, the front bearing support plate 10A is illustrated in FIG. 3 as being separated from the rear bearing support plate 10B attached to the front end of transmission casing 2. The hollow cylindrical portion 10a referred to before projects forwardly from a lower portion of the front bearing support plate 10A. A hollow cylindrical support portion 10c is also formed such that it is located above the portion 10a and also projects forwardly. The front plate 10A further includes at its top end an integral mounting plate portion 10d which is used for mounting the control valve assembly 16 referred to before.

Figure 1B:
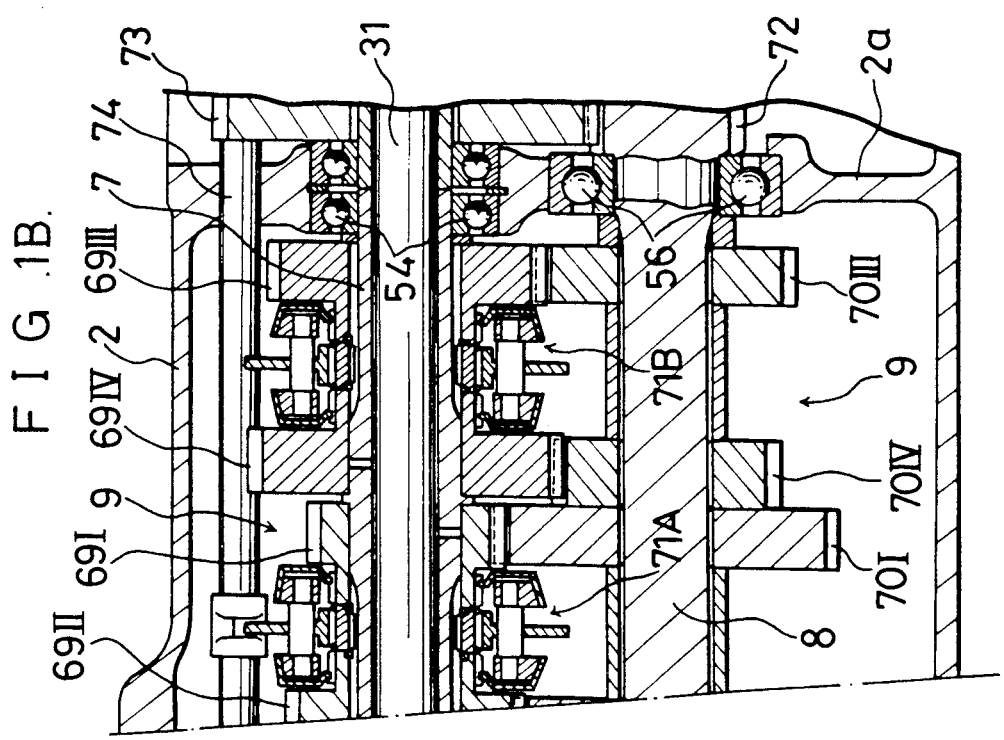

As shown in FIG. 1A, the primary shaft 4 is supported at its front end side by the intermediate wall 1a of front housing 1 through a ball bearing 47. A ball bearing 48 for receiving the primary shaft 4 at its rear end side is fittingly received by the intermediate shaft 17, so that the primary shaft is supported at its rear end side by the front bearing support plate 10A through the intermediate shaft 17. The first speed change shaft 5 is supported at its front and rear end portions by the intermediate wall 1a and front bearing support plate 10A through ball bearings 49 and 50, respectively. The intermediate shaft 17 is supported at its front and rear end portions by the front and rear bearing support plates 10A and 10B through wall bearings 51 and 52, respectively. As shown in FIGS. 1A and 1B, the drive shaft 7 and second speed change shaft 8 which are disposed within the transmission casing 2 are supported respectively by the rear bearing support plate 10B and intermediate wall 2a of the transmission casing through ball bearings 53, 54 and 55, 56. Of the hollow intermediate shaft 17 and drive shaft 7, the intermediate shaft 17 is made larger in diameter. These shafts 7 and 17 are connected with each other within the rear bearing support plate 10B using a splined connection 57. Drive shaft 31 of the implement-driving power transmission system is connected to the primary shaft 4 within the hollow intermediate shaft 17 using a coupling sleeve 58.

As shown in FIG. 1A, the additional speed change mechanism 6 employed in the first embodiment is fashioned to a fluid-operated mechanism. Two gears 59 and 60 are fixedly mounted on the primary shaft 4, and two gears 61 and 62 are rotatably mounted on the first speed change shaft 5. Of these gears, gears 59 and 61 are engaged directly Gears 60 and 62 are engaged through an idler gear 63 which is supported rotatably by the intermediate wall 1a. Two of the fluid-operated clutches 12 and 13 referred to before are provided and has a common clutch housing 64 which is fixedly mounted on the change shaft 5. Each of the clutches 12 and 13 is of a frictional disk type comprising opposite sets of frictional elements which are slidably but non-rotatably supported respectively by the clutch housing 64 and by each of the gears 61 and 62. As is usual, each of the clutches 12 and 13 further comprises a fluid chamber 12a, 13a formed in the clutch housing 64, a return spring 12b, 13b for disengaging the clutch, and an annular piston 12c, 13c. The latter is moved against the biasing of spring 12b, 13b, when fluid under pressure is supplied into the fluid chamber 12a, 13a, so as to cause a frictional engagement between the opposite sets of frictional elements and to thereby couple each of the gears 61 and 62 to the change shaft 5. The clutch-operating fluid passages 14 and 15, referred to before, in the change shaft 5 communicate with the fluid chambers 12a and 13a of the respective clutches 12 and 13. The change shaft 5 further includes lubricant passages 65A and 65B, which supply lubricant oil to bearing portions on the change shaft 5, and lubricant passages 66A and 66B which supply lubricant oil to the frictional elements of the respective clutches 12 and 13.

An output gear 67 disposed just before the front bearing support plate 10A is fixedly mounted on the first speed change shaft 5. This output gear 67 meshes with gear 68, formed integrally with the intermediate shaft 17 at its foremost end, so that shaft 17 is driven to rotate by the change shaft 5.

As shown in FIGS. 1A and 1B, the main speed change mechanism 9 is fashioned to a synchromesh transmission mechanism which performs four-ratio speed change transmission between the drive shaft 7 and second speed change shaft 8. Four gears 69I, 69II, 69III and 69IV, mounted rotatably on the drive shaft 7, mesh respectively with four gears 70I, 70II, 70III and 70IV, mounted fixedly on the change shaft 8, so as to provide first to fourth change gear trains. A pair of double-acting synchronizer clutch assemblies 71A and 71B are mounted on the drive shaft 7 for coupling gears 69I–69IV to the shaft 7 one at a time.

As shown in FIG. 2, the second speed change shaft 8 is connected drivingly to the lay shaft 23 through a speed reduction gearing having meshing gears 72 and 73, The auxiliary speed change mechanism 25 comprises two speed change gear trains between the lay shaft 23 and propeller shaft 24. This mechanism 25 includes a clutch which may operate to connect propeller shaft 24 directly to the change shaft 8. Consequently, three speed ratios can be given to the propeller shaft 24 by this change mechanism 25. For operating main and auxiliary speed change mechanisms 9 and 25, four shifter shafts 74 shown in FIGS. 1A, 1B and 3 are provided which extend longitudinally of the tractor and are slidably supported respectively by the intermediate and rear walls 2a and 2b of transmission casing 2 and also by the rear bearing support plate 10B.

Referring to hydraulic system for the fluid-operated clutches 12 and 13, a fluid supply pipe 75 shown in FIG. 3 is connected to the hydraulic pump 32 shown in FIG. 2 and extends forwardly within the transmission casing 2. The rear bearing support plate 10B includes in it a fluid passage 76, shown in FIGS. 1A and 3, which communicates with the fluid supply pipe 75 and has an open end at the front surface of rear bearing support plate 10B. As shown in FIG. 1A, the front bearing support plate 10A includes a fluid passage 77P which is aligned and communicates with fluid passage 76 in the rear plate 10B. As shown in FIG. 4, the front plate 10A further includes in its rear surface recessed fluid passages 18, 19, 77L$_1$ and 77L$_2$ which extend between upper and lower end portions of the plate 10A. These recessed fluid passages are sealed by the rear plate 10B or its front surface when the front and rear plates 10A and 10B are assembled.

The fluid passage 77P communicates, as shown in FIG. 1A, with a recess 78P in the upper surface of mounting plate portion 10d of the front bearing support plate. As shown in FIG. 3, the upper surface of the plate portion 10d includes further recesses 78F, 78R, 78L$_1$ and 78L$_2$. The upper end of the fluid passages 18, 19, 77L$_1$ and 77L$_2$ shown in FIG. 4 communicate respectively with these recesses 78F$_1$, 78R, 78L$_1$ and 78L$_2$ similarly as the fluid passage 77P. As shown in FIG. 1A, the first speed change shaft 5 includes, at its outer surface and within the hollow cylindrical portion 10a of front bearing support plate 10A, three annular grooves which are sealed respectively by the inner wall of the cylindrical portion 10a so as to provide three annular fluid chambers 14a, 15a and 79L$_1$. Clutch-operating fluid passages 14 and 15 in the change shaft 5 open at their ends at the annular chambers 14a and 15a, respectively. Lubricant passages 65A and 65B in the change shaft 5 open at their ends at the fluid chamber 79L$_1$. The hollow cylindrical portion 10a includes a rear end opening, and lubricant passages 66A and 66B in the change shaft 5 has open rear ends (not shown) at the rear end face of shaft 5 so as to communicate with another fluid chamber 79L$_2$ which is formed between front and rear bearing support plates 10A and 10B. Lower ends of the fluid passages 18, 19, 77L$_1$ and 77L$_2$ shown in FIG. 4 communicate respectively with fluid chambers 14a, 15a, 79L$_1$ and 79L$_2$ set forth above.

As shown in FIG. 3, the control valve assembly 16 is fashioned such that it is fixedly mounted on the mounting plate portion 10d using bolts 81 which are threadingly engaged to threaded bores 80 in the plate portion. The control valve assembly 16 includes in it fluid passages (not shown) which communicate respectively with recesses 78P, 78F, 78R, 78L$_1$ and 78L$_2$ in the upper surface of plate portion 10d. It is fashioned that recess 78P is used as an inlet port of the valve assembly 16, recesses 78F and 78R are used as clutch-operating fluid outlet ports of the valve assembly, and recesses 78L$_1$ and 78R are used as lubricant oil outlet ports of the valve assembly.

Figure 5:
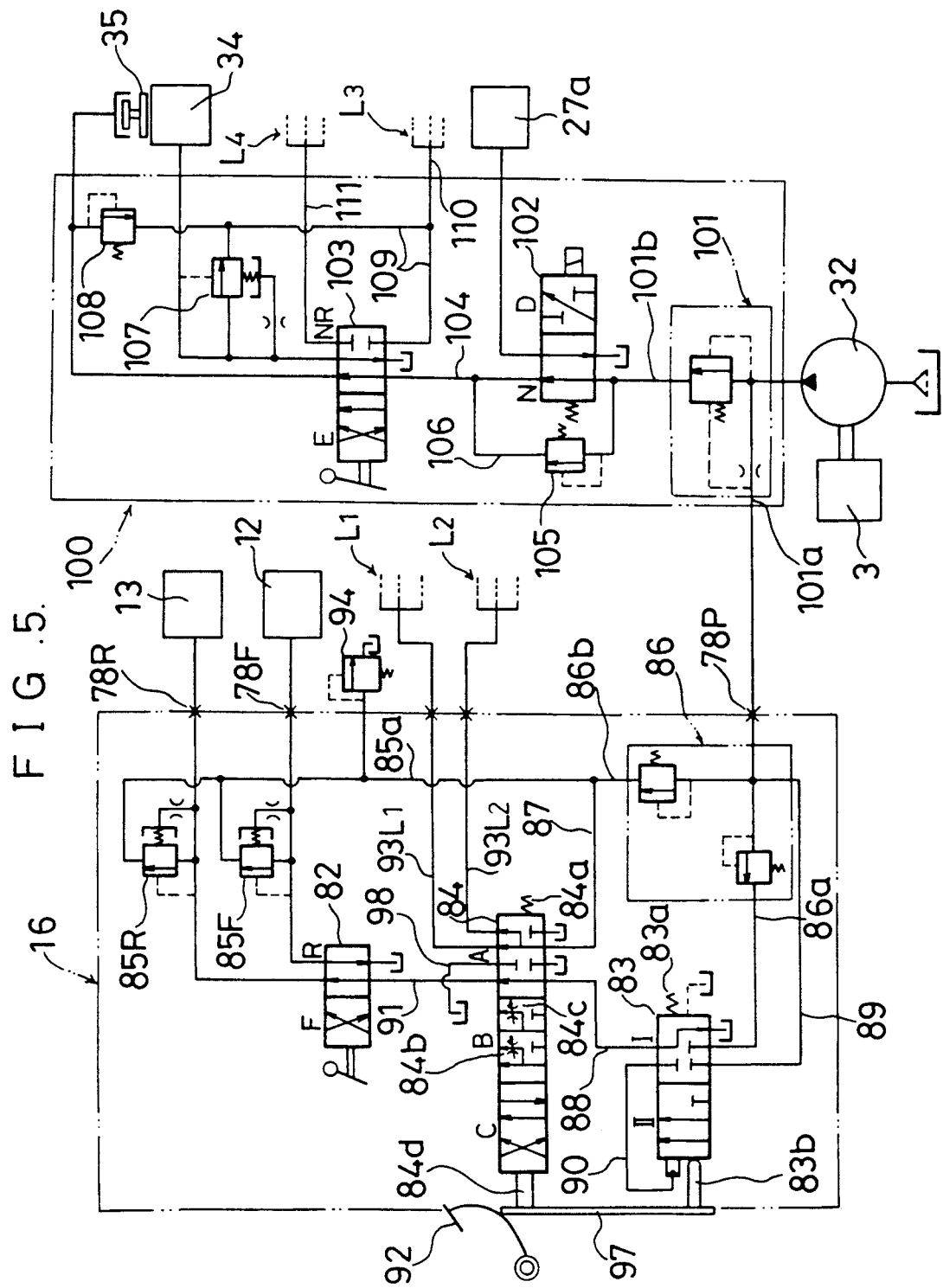
FIG. 5 is a schematic view showing a hydraulic system employed in the tractor shown in FIG. 1.

Structure of the control valve assembly 16 is shown schematically on the left of FIG. 5. This assembly 16 comprises a control valve 82 for controlling supply of fluid to the fluid-operated clutches 12 and 13. The valve assembly further comprises a shut-off valve 83 and pressure-reducing valve 84 through which fluid is supplied to the control valve 82. The control valve has a forward direction position F for operating the clutch 12 and a backward direction position R for operating the clutch 13. Fluid pressure applied to the clutches 12 and 13 is established or determined respectively by modulating relief valves 85F and 85R well-known to the art.

A flow divider valve 86 which divides its inflow into two flows of a constant ratio is disposed in the upstream side of shut-off valve 83. One of the outlet paths 86a of this valve 86 is connected to the shut-off valve 83, whereas the other outlet path 86b is connected, together with fluid-relieving path 85a from the relief valves 85F and 85R, to a lubricant supply path 87 which in turn is connected to the pressure-reducing valve 84.

The shut-off valve 83 has a shut-off position I, where path 86a is blocked and path 88 for connecting the valve 83 to the pressure-reducing valve 84 is connected to a fluid reservoir or sump, and an open position II where path 86a is connected to the path 88. A valve spring 83a is provided which biases shut-off valves 83 to move to the shut-off position I. A fluid pressure-applying path 89 is branched from the inlet side of flow divider valve 86 and is connected to the shut-off valve 83. Another fluid pressure-applying path 90 which is connected to the path 89 at the open position II of shut-off valve 83 is provided for applying fluid pressure to this valve 83 against the biasing of valve spring 83a. It is thus seen that, when the shut-off valve 83 has once been operated to displace to its open position II, it is kept in this open position by fluid pressure applied through paths 89 and 90 even after an operating force applied to the valve 83 has been released.

The pressure-reducing valve 84 is fashioned to have a non-reducing position A, a pressure-reducing position B, and a pressure-unloading position C. At the non-reducing position A, the reducing valve 84 connects the path 88 from shut-off valve 83 to a connecting path 91 between the reducing valve 84 and control valve 82 without causing any reduction in fluid pressure. A valve spring 84a is provided which biases the valve 84 to move to the non-reducing position A. A pedal 92 is provided for operating the reducing valve 84 to displace against the biasing of valve spring 84a from the non-reducing position A to the pressure-reducing position B and, then, to the pressure-unloading position C.

The pressure-reducing valve 84 is fashioned such that, when it is displaced to its reducing position B by an operation of the pedal 92, a part of fluid flowing-in from the path 88 is drained through a variable orifice 84b into a fluid-draining path 98 so that fluid pressure in the connecting path 91 is reduced whereby the fluid-operated clutch 12 or 13 is brought into a slipping engagement. Consequently, each of the clutches 12 and 13 may be engaged in a slipping condition so as to travel the tractor at a variable low speed. At the pressure-unloading position C where the valve 84 is displaced when the pedal 92 is fully trod down, the path 88 is connected to the fluid-draining path 98 and the connecting path 91 is connected to fluid reservoir so that no fluid pressure is applied to the fluid-operated clutch 12 or 13 whereby the tractor is stopped.

The pressure-reducing valve 84 is also fashioned such that it controls supply of lubricant oil to the bearing portions on the first speed change shaft 5 shown in FIG. 1A and to the frictional elements of the clutches 12 and 13 shown in FIG. 1A. Such bearing portions and frictional elements to be lubricated are shown in FIG. 5 by designating them with reference characters $L_1$ and $L_2$. As shown in FIG. 5, the reducing valve 84 includes two lubricant outlet ports to which lubricant supply paths $93L_1$ and $93L_2$ are connected, respectively. The path $93L_1$ supplies lubricant oil to the bearing portions $L_1$ through the fluid passages $77L_1$ (FIG. 4) and through the fluid chamber $79L_1$ and fluid passages 65A, 65B (FIG. 1A), whereas the path $93L_2$ supplies lubricant oil to the frictional elements $L_2$ through the fluid passages $77L_2$ (FIG. 4) and through the fluid chambers $79L_2$ and fluid passages 66A, 66B (FIG. 1A). The pressure-reducing valve 84 is fashioned such that, although it allows, at its non-reducing position A, a free flow of fluid from the lubricant supply path 87 to both of the lubricant supply paths $93L_1$ and $93L_2$, it restricts, at its pressure-reducing position B, flow of fluid between the paths 87 and $93L_2$ by a variable orifice 84c and it connects, at its pressure-unloading position C, the lubricant supply path $93L_2$ to oil reservoir or sump. Consequently, when one of the fluid-operated clutches 12 and 13 is in a slippingly engaged condition at the pressure-reducing position B of valve 84, lubricant oil supplied to the frictional elements $L_2$ is reduced so as to depress influence of lubricant oil upon the slipping engagement between opposite sets of frictional elements. At the pressure-unloading position C of reducing valve 84 where the tractor is stopped due to unloading of pressure applied to the clutches 12 and 13 by the valve 84, lubricant oil is drained from around the frictional elements so that rotation of frictional elements of the driven side of clutch (which may be caused by a dragging action of lubricant oil) is well avoided so as thereby to prevent an unexpected start of the tractor. A relief valve 94 for establishing pressure of lubricant oil is disposed at the outside of control valve assembly 16 and, as shown in FIG. 1A, within the mounting plate portion 10d.

As shown in FIG. 1A, an opening to be closed by a cover 95 is formed in the top wall of front housing 1 for assembling an operating mechanism for the control valve assembly 16 into the housing 1. A vertical control shaft 96 is rotatably supported by the cover 95 and has an arm 96a, attached to its top end, which is operatively connected to the pedal 92 shown in FIGS. 5. Another arm 96b is attached to a lower end portion of the control shaft 96 and is engaged to an operating plate 97. As shown in FIGS. 1A, 3 and 5, a push pin 83b for displacing the shut-off valve 83 and a control rod portion 84d of the pressure-reducing valve 84 are attached to the operating plate 97 so that, when the control shaft 96 is operated to rotate into a direction so as to push the operating plate 97 through the arm 96b, both of the shut-off valve 83 and pressure-reducing valve 84 are displaced at a same time against their valve springs 83a and 84a. Consequently, when the pedal 92 is trod down so as to displace the reducing valve 84 to its pressure-reducing position B and to pressure-unloading position C, the shut-off valve 83 is displaced at the same time from its shut-off position I to its open position II. When the pedal 92 is then freed, the push pin 83b is moved away from the shut-off valve 83. In this condition, however, the shut-off valve 83 remains unmoved and is kept in its open position II due to fluid pressure applied through paths 89 and 90, as described before. When engine 3 and, therefore, hydraulic pump 32 is stopped so that fluid pressure is not supplied to the control valve assembly 16, the shut-off valve 83 is returned to its shut-off position I by the biasing force of valve spring 83a.

Owing to the shut-off valve 83, a condition of safety is attained when engine 3 is started. Because the shut-off valve 83 takes its shut-off position I still after the engine has been started, no fluid pressure is applied towards the fluid-operated clutches 12 and 13 so that the tractor does not start to travel. For the start of tractor, pedal 92 is trod down so as to displace the pressure-reducing valve 84 to its pressure-unloading position C and, at the same time, to displace the shut-off valve 83 to its open position II. After that, the pedal 92 is released gradually so as to return the pressure-reducing valve to its non-reducing position A via its pressure-reducing position B. By this, the fluid-operated clutch 12 or 13 is engaged via a slipping condition so that the tractor is gradually started in a safe manner.

As shown in FIG. 2, top wall of the transmission casing 2 includes at its rear half an opening, closed by a cover 99, for assembling an operating mechanism for the auxiliary speed change mechanism 25 into the transmission casing. Another valve assembly 100 is mounted on an inner surface of the cover 99. Structure of this valve assembly 100 is also shown in FIG. 5.

Each of the front wheel-driving clutch 27a and PTO clutch 34 is fashioned to a fluid-operated clutch which is also powered by the hydraulic pump 32. A flow divider valve 101 is provided in the valve assembly 100 and divides its inflow from the pump 32 into a constant flow, flowing out to an outlet path 101a and being supplied to the control valve assembly 16, and a surplus flow flowing out to another outlet path 101b.

As also shown in FIG. 5, the surplus flow outlet path 101b is connected to an electromagnetic control valve 102 for the front wheel-driving clutch 27a. This control valve 102 connects at its neutral position N shown the path 101b to a fluid supply path 104 which is connected to a control valve 103 for the PTO clutch 34. Relief valve 105 for establishing fluid pressure applied to the front wheel-driving clutch at an operative position D of the electromagnetic control valve 102 is disposed in a bypath 106 between paths 101b and 104. At a condition where the clutch 27a is engaged, fluid relieved from the relief valve 105 is thus supplied to the path 104.

A modulating relief valve 107 is employed for establishing fluid pressure which is applied to the PTO clutch 34 when the control valve 103 is displaced from its neutral position NR to its operative position E so as to engage the clutch 34. Brake 35 set forth before by referring to FIG. 2 is of a fluid-operated type, as shown in FIG. 5. Fluid pressure established by a relief valve 108 is applied to this brake 35 when the control valve 103 is returned to its neutral position NR so as to disengage the clutch 34. Fluid relieved from relief valves 107 and 108 flows into a path 109. In FIG. 5, reference characters $L_3$ and $L_4$ represent respectively bearing means, associated with clutch 34, and frictional elements of the clutch 34. As shown, the path 109 is connected directly to a fluid path 110 for supplying lubricant oil to the bearing means $L_3$. A fluid path 111 for supplying lubricant oil to the frictional elements $L_4$ is connected to the outlet side of control valve 103 through which paths 109 and 111 are connected only at the operative position E of valve 103. At the disengaged condition of clutch 34, lubricant oil is not supplied to the frictional elements $L_4$ of this clutch so that a dragging action of lubricant oil upon frictional elements of the driven side of clutch 34 is reduced whereby burden of the brake 35 is lightened.

In the first embodiment detailed above, shifting operation of each of the main and auxiliary speed change mechanisms 9 and 25 is carried out under a condition where the pressure-reducing valve 84 is displaced to its pressure-unloading position III so that transmission of power is interrupted at the additional speed change mechanism 6. Shifting operation of the PTO speed change mechanism 39 is carried out under a condition where the PTO clutch 34 is disengaged. When the tractor is parked, pedal 92 is locked in its lowermost position.

PTO shaft 29 shown in FIG. 2 is used for driving an auxiliary implement, such as a rotary tiller or mower, which is connected to the rear of tractor and drawn by the tractor. Under a condition where change shaft 38 is connected to the PTO shaft by the PTO-selecting clutch 42, PTO shaft 29 is driven to rotate at a speed independent of that of the tractor. Under a condition where ground PTO gear 41 is selected, PTO shaft 29 is driven to rotate at a speed proportional to that of the tractor.

In place of the fluid-operated additional speed change mechanism 6 shown, which provides a forward direction speed-change ratio and a backward direction speed-change ratio, a fluid-operated change mechanism may, of course, be provided which permits forward direction high and low speed-change ratios or three or more speed-change ratios.

Figure 6:
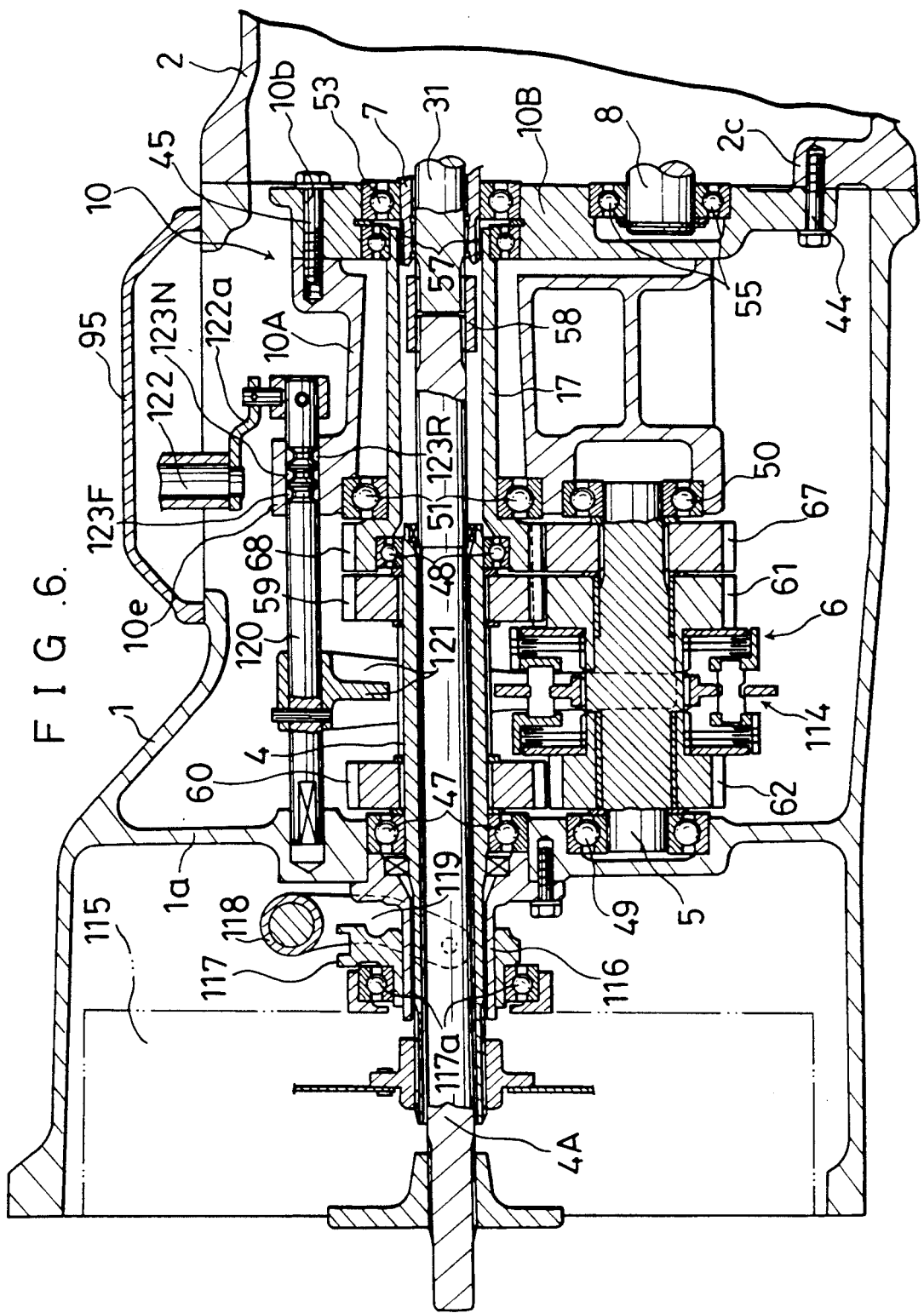
FIG. 6 is a sectional side view, partially developed, similar to FIG. 1A but showing a part of a tractor in which a second embodiment of the transmission assembly according to the present invention is employed.

In FIG. 6, there is shown a second embodiment in which the additional change mechanism 6 is fashioned to a mechanically operated mechanism.

In this second embodiment, a main clutch 115 and an operating mechanism for it are disposed within the front housing 1 and in front of the intermediate wall 1a. The main clutch 115 has a conventional structure (not shown) and connects a hollow primary shaft 4 releaseably to a main primary shaft 4A which is driven constantly by the engine (not shown). As is conventional, the operating mechanism for the main clutch 115 comprises a release shifter 117 which is mounted slidably on a hollow cylindrical support 116 fixedly attached to the intermediate wall 1a. This shifter 117 carries a release bearing 117a. A release fork 119 engaging the release shifter is attached to a hollow control shaft 118 which is operated to rotate by a clutch pedal (not shown) so as to move the shifter 117 forwardly through fork 119 and thereby to disengage the main clutch. The main primary shaft 4A is coupled at its rear end to a drive shaft 31, similar to the drive shaft 31 shown in FIGS. 1A and 1B, using a coupling sleeve 58.

In the second embodiment, too, two gears 59 and 60 are fixedly mounted on the primary shaft 4 and two gears 61 and 62 are rotatably mounted on the first speed change shaft 5. Gear 61 meshes directly with gear 59, whereas gear 62 meshes with gear 60 via an idler gear (not shown) corresponding to the idler gear 63 shown in FIG. 1A. As shown in FIG. 6, a double-acting synchronizer clutch assembly 114 is mounted on the change shaft 5 for coupling gears 61 and 62 selectively to the shaft 5. Shifter 121 for operating the synchronizer clutch assembly 114 is carried by a slidable shifter rod 120 which is supported by the intermediate wall 1a and by the front bearing support plate 10A. A vertical control shaft 122 is supported rotatably by a cover 95, similar to the cover 95 shown in FIG. 1A, and carries at its lower end an arm 122a for displacing the shifter rod 120. In a rod-supporting portion 10e formed integrally on the upper surface of front bearing support plate 10A, a spring-biased latching ball (not shown) is disposed which projects into one of annular latching grooves 123N, 123F and 123R in the outer surface of shifter rod 120 for latching the rod at one of neutral and operative conditions of the change mechanism 6.

As is the case of the first embodiment, the bearing support frame 10 is divided into front and rear bearing support plates 10A and 10B in this second embodiment, too, for an easy molding. The front bearing support plate 10A has a thickness larger than the corresponding plate 10A shown in FIG. 1A, because axial interval between the intermediate wall 1a and bearing support frame 10 required for the mechanically operated change mechanism 6 is smaller than that required for the fluid-operated change mechanism 6 shown in FIG. 1A. The other parts of the second embodiment shown in FIG. 6 are substantially same as those of the first embodiment and are designated by like reference characters. A main speed mechanism same as that shown in FIGS. 1A and 1B is disposed within a front half of the transmission casing 2, although it is omitted from FIG. 6.

Referring now to FIGS. 7A to 13, there is shown a third preferred embodiment of the transmission assembly according to the present invention.

Figure 7A:
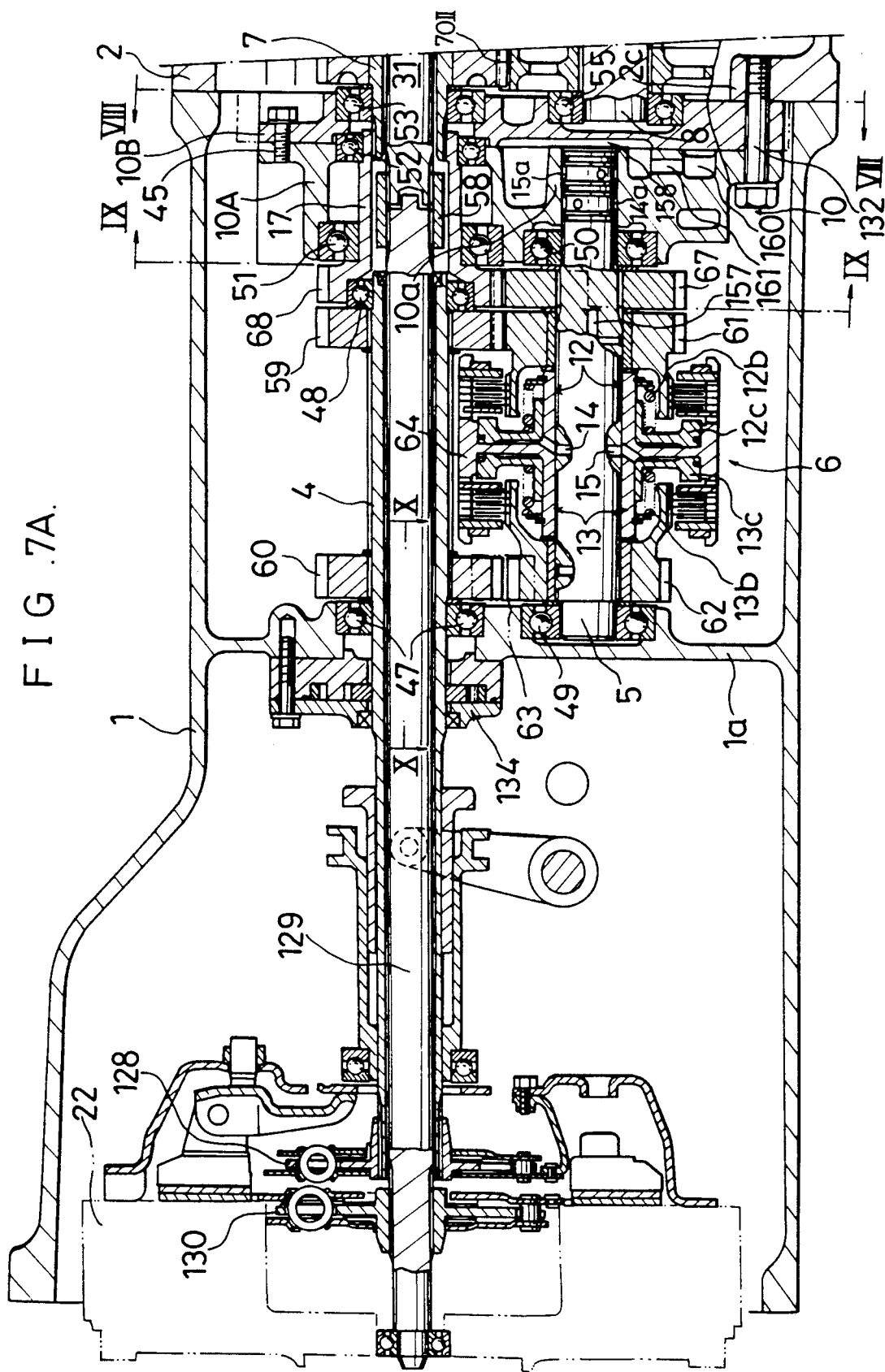
FIG. 7A and 7B are sectional side views similar to FIGS. 1A and 1B but showing a part of a tractor in which a third embodiment of the transmission assembly according to the present invention is employed.
Figure 7B:
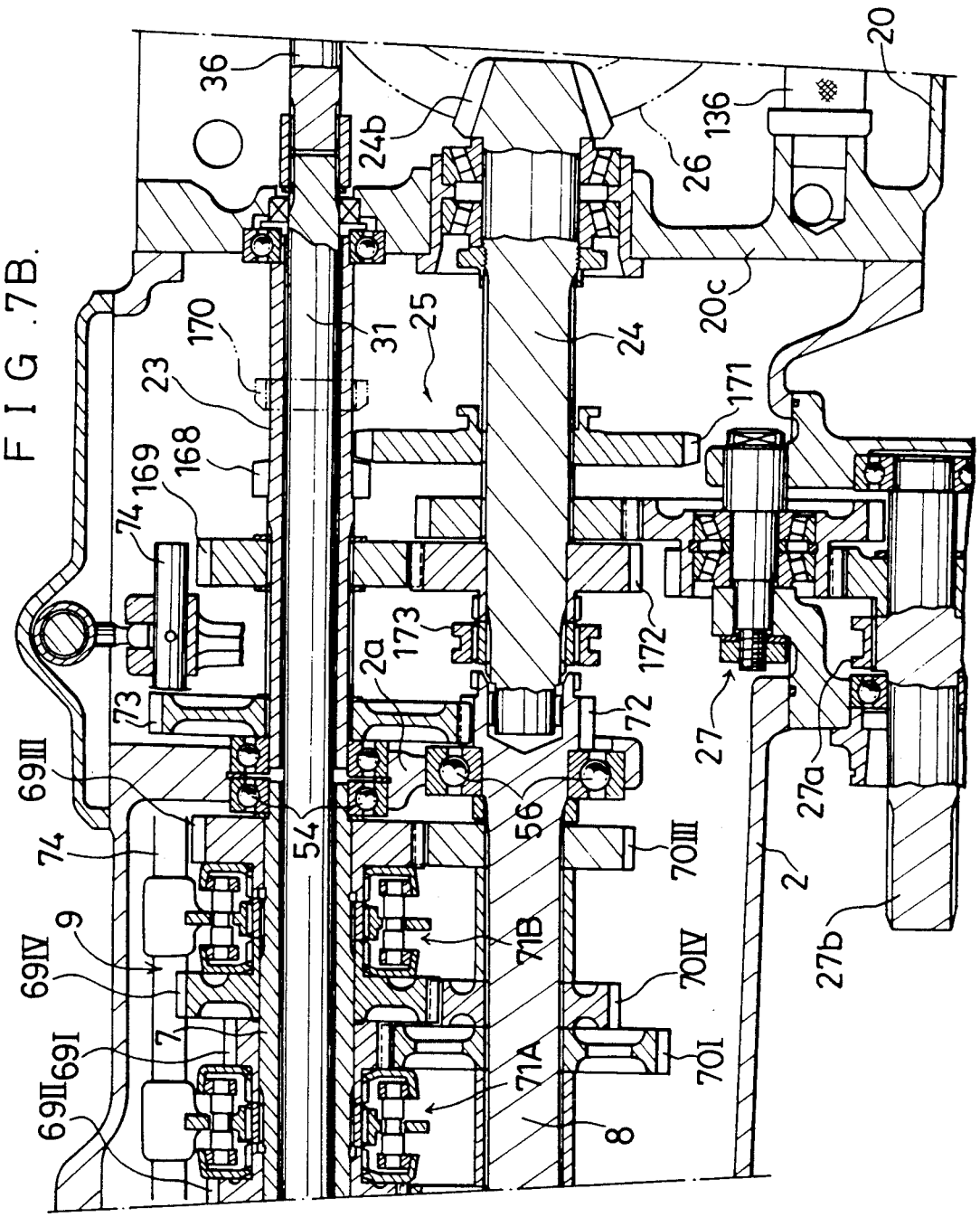

As shown in FIGS. 7A, 7B and 7C, the vehicle body comprises a front housing 1, transmission casing 2 and rear housing 20 which are arranged in series in a longitudinal direction of the tractor and are fastened together. The transmission casing 2 has an open rear end, and the rear housing 20 has a front wall 20c which closes the rear end opening of transmission casing when the casing 2 and housing 20 are fastened together. A hollow primary shaft 4 is provided which is coupled at its front end to an engine flywheel 22 using a damper coupling 128. A primary shaft 129 for the implement-driving power transmission system extends through the hollow primary shaft 4 and is connected at its front end portion to the flywheel 22 through a PTO clutch 130. Similarly to the transmission assembly shown in FIG. 2, an auxiliary speed change mechanism 25 is disposed within a rear half of the transmission casing 2.

As shown in FIGS. 7A and 7B, the additional speed change mechanism 6 and main speed change mechanism 9 have structures substantially same as those of the corresponding change mechanisms 6 and 9 employed in the first embodiment. Accordingly, repeated descriptions are omitted. This third embodiment has a unique feature in that a control valve assembly corresponding to the valve assembly 16 employed in the first embodiment is disposed within the bearing support frame 10.

As shown in FIG. 7A and FIGS. 8 to 13, the bearing support frame 10 is divided in this third embodiment, too, into front and rear bearing support plates 10A and 10B which are fastened together using bolts 45 and 132. The latter bolts 132 are also used for securing the support frame 10 to the boss portions 2c of transmission casing. These plates 10A and 10B are used for supporting primary shaft 4, first speed change shaft 5, intermediate shaft 17, drive shaft 7 and second speed change shaft 8 in a fashion substantially the same as in the first embodiment. The front bearing support plate 10A of this third embodiment also includes a hollow cylindrical portion 10a which receives a rear end portion of the first change shaft 5 so as to form annular fluid chambers 14a and 15a communicating with clutch-operating fluid passages 14 and 15 in the change shaft 5. In this third embodiment, however, control valve 82, shut-off valve 83, pressure-reducing valve 84 and modulating relief valves 85F and 85R corresponding respectively to valves 82, 83, 84, 85F and 85R shown in FIG. 5 are included in the bearing support frame 10.

As shown in FIGS. 7A and 10, a hydraulic pump 134 which is fashioned to a gear pump using the primary shaft 4 as its pump shaft is mounted on the front surface of the intermediate wall 1a of front housing 1. A fluid suction pipe 135 shown in FIG. 10 is provided at a side of the vehicle body for feeding fluid from an oil sump in the rear housing 20 via a filter 136, shown in FIGS. 7B and 7C, to the pump 134 and to another pump (not shown) driven directly by engine. As shown in FIG. 10, a fluid suction passage 137 is formed in the intermediate wall 1a for connecting the suction pipe 135 to a suction port 134a of the pump 134. Another fluid passage 138 communicating with a discharge port 134b of the pump 134 is formed in the intermediate wall 1a and is connected to a fluid supply pipe 139 disposed within the front housing. The supply pipe 139 extends rearwardly from the intermediate wall 1a and is connected, as shown in FIG. 12, to a fluid inlet passage 140 in the front bearing support plate 10A.

As shown in FIGS. 8 and 11, the control valve 82, shut-off valve 83 and pressure-reducing valve 84 are slidably disposed axially of the vehicle in a lower end portion of the support frame 10. The shut-off valve 83 and reducing valve 84 are disposed at one side and are connected with each other through a fluid passage 142 in the front support plate 10A. The control valve 82 is disposed at the other side and is connected to the reducing valve 84 through a fluid passage 143 in the front support plate 10A. As shown in FIG. 12, the fluid inlet passage 140 is connected to an inlet side of the shut-off valve 83 through fluid passages 144 and 145 in the front support plate 10A. A bore or passage 146 is branched from the fluid passage 145, and a relief valve 147 is disposed within this passage 146 for establishing a predetermined fluid pressure in the inlet passage 145 of shut-off valve 83. As shown in FIG. 9, the modulating relief valves 85F and 85R are disposed within an upper half of the front bearing support plate 10A at one and the other sides of this plate.

Figure 13:
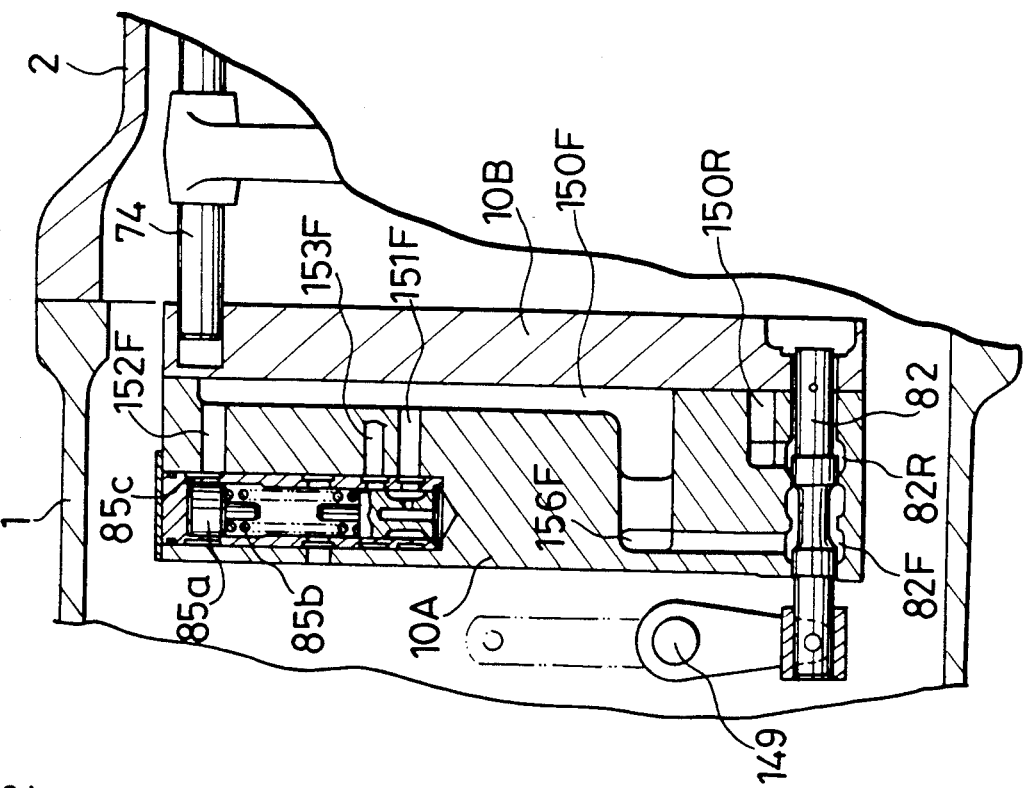
FIG. 13 is a sectional plan view taken generally along line XII—XII of FIG. 9.

As shown in FIGS. 11 and 13, the control valve 82 is disposed within a bore, extending through the support frame 10, such that it projects at its front end portion into a space within the front housing 1. A pair of outlet ports 82F and 82R for this control valve are formed in the front support plate 10A. At the position of control valve 82 shown in FIGS. 11 and 13, the outlet port 82F communicates with the inlet passage 143 of valve 82 while the outlet port 82R communicates at its rear side with the interior of transmission casing 2. At a position where the control valve 82 is displaced rearwardly by an amount, the outlet port 82R communicates with the inlet passage 143 while the outlet port 82F communicates at its front side with the interior of front housing 1. For operating the control valve 82 to displace between the two positions referred to above, a rotatable control shaft 149 shown in FIGS. 9 and 11 is provided which extends through a side wall of the front housing 1. A shifter arm 149a which engages the control valve 82 is attached to an inner end portion of the control shaft 149.

Figure 12:
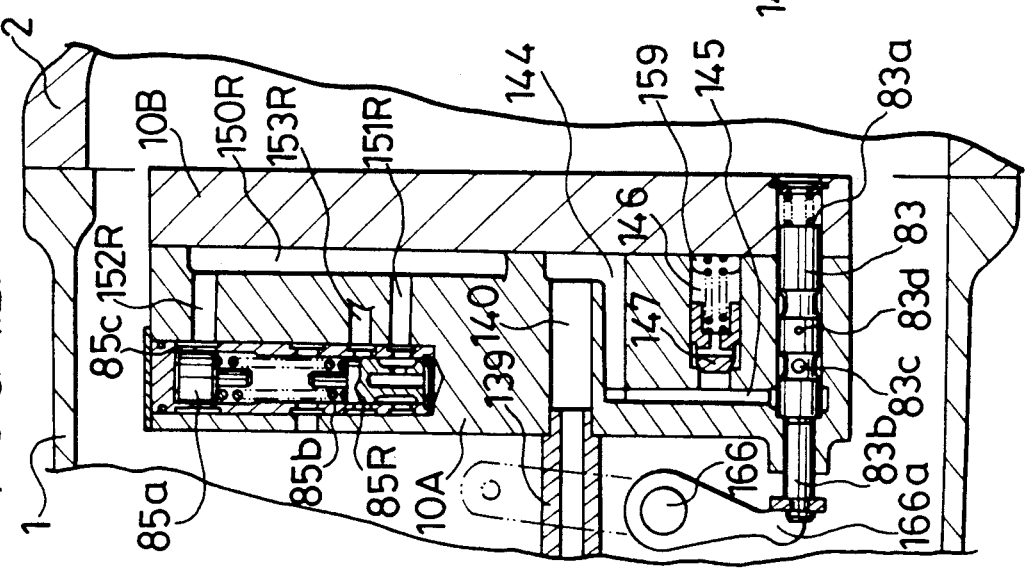
FIG. 12 is a sectional side view taken generally along line XII—XII of FIG. 9.

As shown in FIGS. 9, 12 and 13, each of the modulating relief valve 85F and 85R includes a control piston 85a which receives an end of fluid pressure-establishing spring 85b. As shown in FIGS. 8, 12 and 13, fluid passages 150F and 150R extend upwardly from the outlet ports 82F and 82R of control valve 82, respectively. These passages are connected at their mid levels to inlet ports of the relief valves 85F and 85R through fluid passages 151F and 151R, respectively. Fluid passages 150F and 150R also communicate at their upper ends and through fluid passages 152F and 152R with orifices 85c, respectively, which open at end face positions of the respective control pistons 85a. Relief ports of the relief valves 85F and 85R communicate respectively with fluid passages 153F and 153R in the front support plate 10A and then with a single fluid passage 154 which extends downwardly.

As shown in FIG. 8, the front bearing support plate 10A further includes in it fluid passages 156F and 156R which connect the fluid passages 150F and 150R respectively to the annular fluid chambers 14a and 15a defined, as shown in FIG. 7A, in the cylindrical portion 10a of front bearing support plate 10A. As shown in FIG. 7A, the first change shaft 5 further includes in it a single lubricant passage 157 for supplying lubricant oil to bearing portions on this change shaft and also to frictional elements of the fluid-operated clutches 12 and 13. This lubricant passage 157 communicates at its rear end with a recess 158 in a front surface of the rear bearing support plate 10B. As shown in FIG. 8, the fluid passage 154 coming from the relief ports of modulating relief valves 85F and 85R is disposed such that it communicates at its lower end portion with the recess 158 set forth above. This recess 158 is also communicated to the fluid passage 146, in which the relief valve 147 shown in FIG. 12 is incorporated, through fluid passages 159, 160, 161 and 162 shown in FIG. 8.

As can be understood from the foregoing descriptions, clutch-operating fluid is supplied at one of the two positions of the control valve 82 from one of its outlet ports 82F, 82R to one of the fluid-operated clutches 12, 13 through fluid passages 150F, 150R, and 156F, 156R, one of annular fluid chambers 14a, 15a, and one of fluid passages 14, 15. When the control valve 82 is displaced from one of the two positions to the other position, fluid from one of the outlet ports 82F, 82R is supplied to the end face position of the control piston 85a of one of the modulating relief valves 85F, 85R through fluid passages 150F, 150R and 152F, 152R and through orifice 85c so that control piston 85a is gradually moved so as to heighten the biasing force of pressure-establishing spring 85b and thereby to heighten fluid pressure applied to the clutch gradually to a predetermined normal value. Consequently, the clutch 12, 13 is engaged from its disengaged condition without being subjected to a shock. Fluid relieved from the modulating relief valves 85F and 85R and from the relief valve 147 is supplied, as lubricant oil, to the bearing portions on the change shaft 5 and to the frictional elements of clutches 12 and 13 through the recess 158 and lubricant passage 157 shown in FIG. 7A.

Referring to the shut-off valve 83 shown in FIGS. 11 and 12, this valve is substantially the same as the corresponding valve 83 shown in FIG. 5. At the position of this shut-off valve 83 shown in FIGS. 11 and 12 towards which it is biased to move by a valve spring 83a, the valve 83 blocks the inlet passage 145. An internal passage 83c is formed in the valve and communicates, at the position shown in FIGS. 11 and 12, with the outlet passage 142 of valve 83 through a throttled bore 83d in the valve. A push pin 83b engaging the front end face of valve 83 is provided for forcedly pushing the valve against the biasing of spring 83a to displace into a position where the inlet and outlet passages 145 and 142 are in fluid communication with each other through the internal passage 83c. When the shut-off valve 83 has once been displaced to this position, fluid pressure in the inlet passage 145, established by the relief valve 147, is applied to the valve against the biasing force of spring 83a so that it is kept in that position even after the push pin 83b has been returned to the position shown in FIGS. 12 and 13.

Referring to the pressure-reducing valve 84 shown in FIG. 11, this valve is also substantially same as the corresponding valve 84 shown in FIG. 5. At the position shown in FIG. 11, the reducing valve 84 connects its inlet passage 142, coming from the shut-off valve 83, to its outlet passage 143, directed towards the control valve 82, without providing any restriction to flow of fluid. Another port or passage 164 opens at a valve-inserting bore for the valve 84 and communicates with the fluid passage 160 for lubricant oil. The reducing valve 84 has a land including a notch or orifice 84b through which the inlet passage 142 of valve 84 may communicate with passage 164 when the reducing valve is displaced rearwardly by some amount from the position shown in FIG. 11. At a condition where some fluid is drained into passage 164 through the orifice 84b, fluid pressure in the outlet passage 143 is reduced so that a slippingly engaged condition of each clutch 12, 13 is attained. The pressure-reducing valve 84 is further fashioned such that, when it is further displaced rearwardly, its outlet passage 143 is communicated at a front side of valve 84 into the front housing 1. When valve 84 is displaced to such rearmost position, fluid pressure to be applied to the clutch 12, 13 is unloaded so that the tractor is stopped. At the rearmost position of valve 84, passage 164 is in a non-restricted fluid communication with passage 142 and in a restricted fluid communication at a rear side of valve 84 with the interior of transmission casing 2.

As also shown in FIG. 11, an operating plate 97 is attached to a front end of the reducing valve 84. The push pin 83b for operating the shut-off valve 83 is attached to this operating plate 97. In place of the vertical control shaft 96 shown in FIG. 1A, a horizontal control shaft 166 shown in FIGS. 9, 11 and 12 is provided which extends through a side wall of the front housing 1. An arm 166a is attached to an inner end portion of this control shaft and engages with the operating plate 97. The control shaft 166 is operated to rotate by a pedal (not shown) so as to displace the reducing valve though arm 166a and operating plate 97 from the position shown in FIG. 6 to a pressure-reducing position and then to a pressure-unloading position. At the same time, the shut-off valve 83 is displaced from the position shown in FIG. 11 to an open position where it permits flow of fluid into the passage 142. As described before, the shut-off valve is kept in its open position even after the push rod 83b has been returned to its original position shown in FIG. 11. A condition of safety at the time of engine start detailed before with respect to the shut-off valve shown in FIG. 5 is also attained in this third embodiment.

Of the fluid passages set forth hereinbefore, passages 144, 150F, 150R and 154 are provided generally, as shown in FIG. 8, by recesses formed in the rear surface of front bearing support plate 10A. These passages are sealed, as required, by the front surface of rear bearing support plate 10B. Further, open rear ends of the fluid passages 140, 144, 146, 151F, 151R, 152F, 152R, 153F, 153R and 160 in the front bearing support plate 10A are sealed also by the front surface of the rear bearing support plate 10B. As can be understood from this, a bearing support frame 10 comprising the front and rear bearing support plates 10A and 10B permits a very easy formation of fluid passages.

As shown in FIG. 7B, the auxiliary speed change mechanism 25 disposed within a rear half of the transmission casing 2 includes a hollow lay shaft 23 which is supported respectively by the intermediate wall 2a of transmission casing 2 and by the front wall 20c of rear housing 20. Lay shaft 23 is drivably connected to the second speed change shaft 8 through meshing gears 72 and 73. Propeller shaft 24 is also supported respectively by the intermediate wall 2a and by the front wall 20c and has, at its rear end, a bevel pinion 24b. A pair of smaller and larger gears 168 and 169 are fixedly mounted on the lay shaft 23. At a side of the lay shaft, a gear 170 is disposed which is driven to rotate by the smaller gear 168 through a speed reduction gearing (not shown). A shifting gear 171 which may be engaged selectively with one of the gears 168 and 170 is slidably but non-rotatably mounted on the propeller shaft 24. A gear 172 is rotatably mounted on the propeller shaft 24 and meshes with gear 169 on the lay shaft. A clutch 173 is disposed on the propeller shaft for coupling the gear 172 selectively to the shaft 24. This clutch 173 is fashioned such that it may connect propeller shaft 24 directly to the second change shaft 8. Consequently, four speed ratios can be given to the propeller shaft by the auxiliary speed change mechanism 25 shown in FIG. 7B. Gear mechanism 27 similar to the mechanism 27 shown in FIG. 2 is also provided. This mechanism includes a mechanically operated clutch 27a which is mounted on a transmission shaft 27b for taking-off front wheel-driving power As shown in FIGS. 7A, 7B and 7C, a drive shaft 31 extends through the hollow drive shaft 7 and lay shaft 23 and is connected at its front end to the primary shaft 129 using a coupling sleeve 58 which is disposed within the hollow intermediate shaft 17. This drive shaft 31 is connected drivingly to a PTO shaft 29, extending rearwardly from the rear housing 20, through co-axial shafts 36 and 37 and through meshing gears 175 and 176.

For operating main and auxiliary speed change mechanisms 9 and 25, four slidable shifter shafts 74 (only one of which is shown in FIGS. 7B and 13) are provided and supported respectively by rear bearing support plate 10B and by intermediate wall 2a of the transmission casing 2. In FIG. 8, numeral 178 designates bolts for fastening the front housing 1 and transmission casing 2 together.

Figure 14:
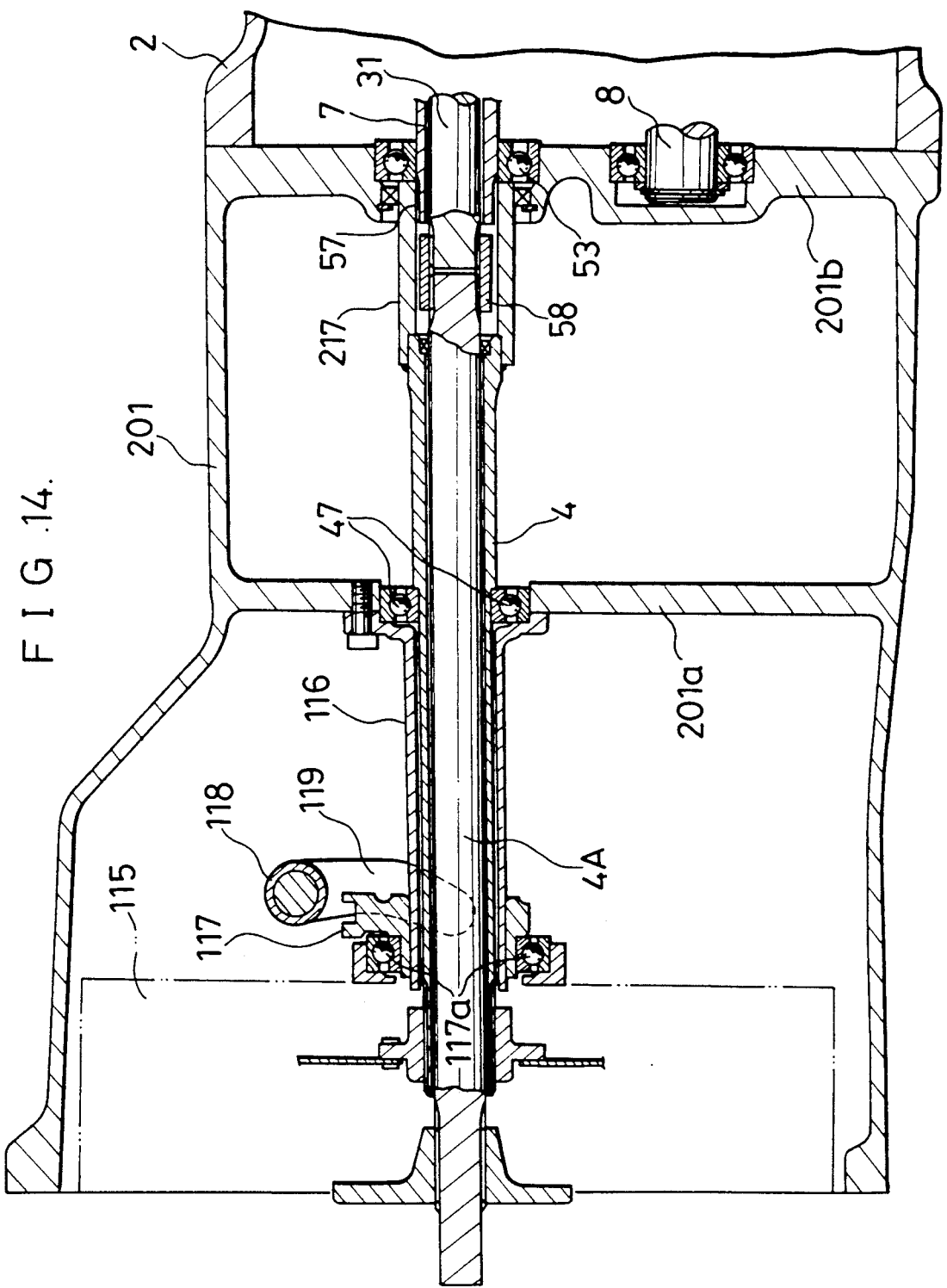
FIG. 14 is a sectional side view similar to FIG. 1A but showing a part of a tractor which is designed to include no additional speed change mechanism within its front housing.

In FIG. 14, there is shown a part of tractor of the present design having no additional speed change mechanism within a front housing 201.

A transmission casing 2 is employed which has a structure same as that of the transmission casing 2 employed in each of the first, second and third embodiments. The front housing 201 includes, other than an intermediate wall 201a, a rear wall 201b which supports respective front end portions of the drive shaft 7 and speed change shaft 8. A hollow primary shaft 4 is provided which is driven by the engine (not shown) through a main clutch 115. This shaft has at its rear end a hollow cylindrical coupling member 217, welded to it, through which the main shaft 4 is coupled to the drive shaft 7 using a splined connection 57. The other parts are fashioned similarly to those shown in FIG. 6 and are designated by like numerals. As described before, no substantial dead space is caused within the transmission casing 2 of the tractor of a different design shown in FIG. 14.

We claim:

1. In a tractor having a front housing and a transmission casing which are arranged in series in a longitudinal direction of the tractor and are fastened together the front housing including an open rear end and a first intermediate wall, an improved transmission assembly comprising:

an additional speed change mechanism (6) disposed within said front housing (1) and behind said first intermediate wall (1a) so as to perform a first speed-change transmission between a primary shaft (4) and a first speed change shaft (5), a main speed change mechanism (9) disposed within a front half of said transmission casing (2) so as to perform a second speed-change transmission between a drive shaft (7), driven by said first speed change shaft (5), and a second speed change shaft (8), said transmission casing (2) comprising an open front end for permitting therethrough an assembly of said main speed change mechanism (9) into said front half of said transmission casing, a second intermediate wall (2a) located behind said main speed change mechanism (9), integral boss means (2c) disposed within and around said open front end, and a bearing support frame (10) disposed within said open rear end of said front housing (1) and secured directly to said boss means;

said primary shaft (4) and said first speed change shaft (5) being directly supported respectively by said first intermediate wall (1a) and by a front end portion of said bearing support frame (10), and said drive shaft (7) and said second speed change shaft (8) being directly supported respectively by a rear end portion of said bearing support frame (10) and by said second intermediate wall (2a); and an intermediate shaft (17) supported directly by said bearing support frame (10) for drivingly connecting said first speed change shaft (5) to said drive shaft (7).

2. The improved transmission assembly of claim 1, wherein said bearing support frame (10) comprises a front bearing support plate (10A) and a rear bearing support plate (10B) which are disposed on each other and are fastened together, said primary shaft (4) and said first speed change shaft (5) being supported by said front bearing plate (10A), said drive shaft (7) and said second speed change shaft (8) being supported by said rear bearing support plate (10B), and said intermediate shaft (17) being supported by said front and rear bearing support plates (10A, 10B).

3. The improved transmission assembly of claim 2, wherein said additional speed change mechanism (6) comprises a fluid-operated mechanism having fluid-operated clutches (12, 13) mounted on said first speed change shaft (5); said front bearing support plate (10A) including a hollow cylindrical portion (10a) which receives a rear end portion of said first speed change shaft; said hollow cylindrical hollow portion includes annular fluid chambers (14a, 15a) communicating with clutch-operating fluid passages (14, 15) formed in said first speed change shaft; a control valve assembly (16) for said additional speed change mechanism mounted on an upper surface of said front bearing support plate (10A); and fluid passages (18, 19) formed between said front and said rear bearing support plates (10A, 10B) for connecting said control valve assembly to said annular fluid chambers (14a, 15a).

4. The improved transmission assembly of claim 1, wherein said additional speed change mechanism (6) comprises a fluid-operated mechanism having fluid-operated clutches (12, 13) mounted on said first speed change shaft (5); said bearing support plate (10A) includes a hollow cylindrical portion (10a) which receives a rear end portion of said first speed change shaft; said hollow cylindrical portion includes annular fluid chambers (14a, 15a) communicating with clutch-operating fluid passages (14, 15) in said first speed change shaft; and a control valve for said additional speed change mechanism disposed within said bearing support frame (10).

* * * * *

UNITED STATES PATENT AND TRADEMARK OFFICE
CERTIFICATE OF CORRECTION

PATENT NO. : 5,058,455

DATED : October 22, 1991

INVENTOR(S) : Shusuke Nemoto et al

It is certified that error appears in the above-identified patent and that said Letters Patent is hereby corrected as shown below:

In Claim 4:

Column 20, line 45, "plate" should be --frame--;

Same line "(10A)" should be --(10)--;

Column 20, line 51, after "valve" --(82)-- should be added.

Signed and Sealed this

Twenty-third Day of February, 1993

*Attest:*

STEPHEN G. KUNIN

*Attesting Officer*     *Acting Commissioner of Patents and Trademarks*